(12) United States Patent
Miller et al.

(10) Patent No.: US 9,260,335 B1
(45) Date of Patent: Feb. 16, 2016

(54) GEOSYNCHRONOUS TRIADS COMMUNICATIONS SYSTEM

(75) Inventors: Julie L. Miller, Auberry, CA (US); Liang C. Chu, Sunnyvale, CA (US); Eric G. Butte, Cupertino, CA (US)

(73) Assignee: Lockheed Martin Corporation, Bethesda, MD (US)

(\*) Notice: Subject to any disclaimer, the term of this patent is extended or adjusted under 35 U.S.C. 154(b) by 800 days.

(21) Appl. No.: 13/440,934

(22) Filed: Apr. 5, 2012

Related U.S. Application Data

(60) Provisional application No. 61/472,572, filed on Apr. 6, 2011.

(51) Int. Cl.
| | |
|---|---|
| H04W 4/00 | (2009.01) |
| H04W 40/00 | (2009.01) |
| H04B 7/185 | (2006.01) |
| C03B 11/16 | (2006.01) |

(52) U.S. Cl.
CPC .................................. *C03B 11/16* (2013.01)

(58) Field of Classification Search
CPC .................................................... H01Q 1/288
USPC .............................. 455/12.1, 13.1, 13.2, 13.3
See application file for complete search history.

(56) References Cited

U.S. PATENT DOCUMENTS

| | | | | |
|---|---|---|---|---|
| 4,427,984 | A * | 1/1984 | Anderson | 343/764 |
| 6,020,845 | A * | 2/2000 | Weinberg et al. | 342/354 |
| 6,671,250 | B1 * | 12/2003 | Schiff | H04B 7/185 370/209 |
| 6,725,012 | B1 * | 4/2004 | Janson et al. | 455/12.1 |
| 2003/0098057 | A1 * | 5/2003 | Mizuno et al. | 136/244 |
| 2004/0042389 | A1 * | 3/2004 | Schiff | H04B 7/185 370/208 |
| 2011/0280178 | A1 * | 11/2011 | Heifner | H04B 7/185 370/325 |

OTHER PUBLICATIONS

Kohno et al., "Cancellation Techniques of Co-channel Interference in Asychronous Spread Spectrum Multiple Access Systems", Electronics and Communications, 1983, pp. 20-29, vol. 66-A, No. 5.
Van Rooyen et al., "Space-Time Processing for CDMA Mobile Communications", 2000, pp. 153-182, Kluwer Academic Publishers.
Verdu, Minimum Probablity of Error for Asynchronous Gaussian Multiple Access Channels, IEEE Transactions on Information Theory, Jan. 1986, pp. 85-96, vol. IT-32, No. 1.
Wang, "Iterative (turbo) soft interference cancellation and decoding for coded CDMA", IEEE Transactions on Communications, Jul. 1999, pp. 1046-1060, vol. 46, No. 7.

(Continued)

*Primary Examiner* — Tilahun B Gesesse
(74) *Attorney, Agent, or Firm* — McDermott Will & Emery LLP

(57) ABSTRACT

A satellite communication system for airborne and reachback communications may include a formation orbiting in one or more slots of a geosynchronous orbit. The formation may include two or more communications satellites (COMSATs) encircling a ring. Each COMSAT of the two or more COMSATs may include a communication module configured to communicate with a plurality of communications assets in a benign or contested environment. The formation may be configured to allow a first communications asset having a dish antenna with a first configuration to communicate independently with each of the two or more COMSATs in a first scenario. The formation may also be configured to allow a second communications asset having a dish antenna with a second configuration to communicate simultaneously with the two or more COMSATs in a second scenario.

12 Claims, 18 Drawing Sheets

(56) References Cited

OTHER PUBLICATIONS

Berrou et al., "Near Shannon limit error correcting coding and decoding turbo codes", Proceeding IEEE International Conference on Communications, May 1993, pp. 1064-1070, vol. 2.

Duel-Hallen et al., "Multiuser Detection for CDMA Systems", IEEE Personal Communications, Apr. 1995, pp. 46-58, vol. 2, Issue 2.

"Satellite formation flying", Wikipedia, the free encyclopedia, last modified Aug. 12, 2012, retrieved from <http://en.wikipedia.org/wiki/Satellite_formation_flying>.

* cited by examiner

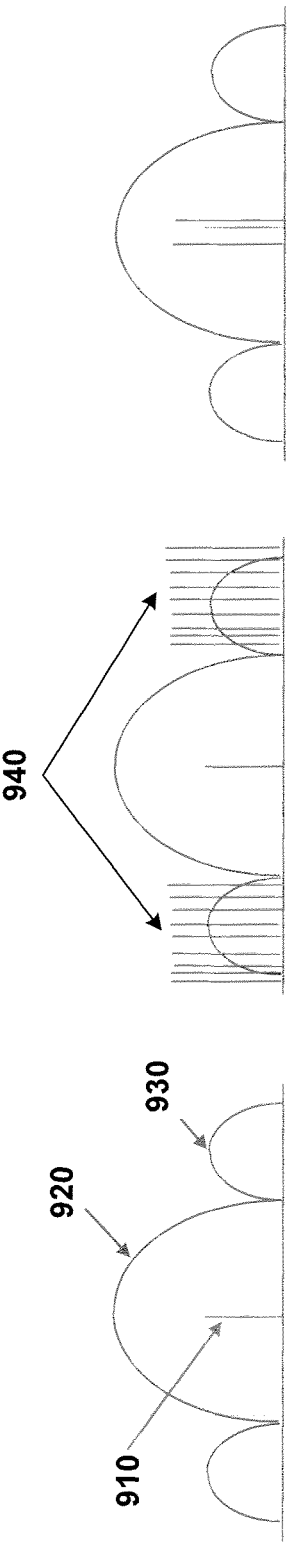
FIG. 9A  FIG. 9B  FIG. 9C
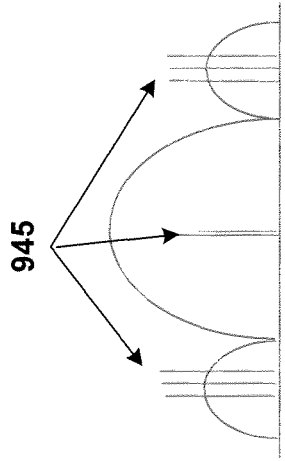
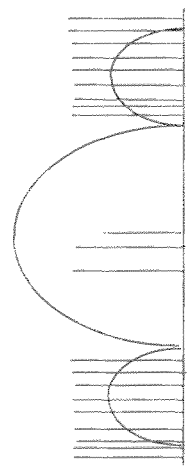
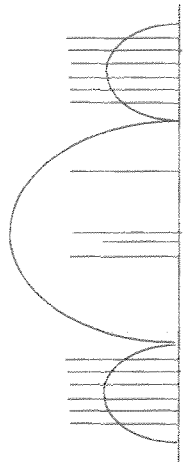
FIG. 9D  FIG. 9E  FIG. 9F Table 1: Triad System: 100% Benign Loading Sample Mix

| Asset | Rate | Qty | Link | Aggregated Bandwidth |
|---|---|---|---|---|
| Global Hawk | 2XCDL | 12 | Trunked Out of Theater | 6,000 MHz |
| Global Hawk | 1XCDL | 12 | Intra-Theater | 3,000 MHz |
| STT | 175 Mbps | 9 | Intra-Theater | 1620 MHz |
| SNE (FDM) | 2.5 Mbps | 459 | Intra-Theater | 1380 MHz |

Table 2: Triad System: 100% Contested: All High Power Wide Beam Jammers (100% Regional Targeting ABF Processing) (Max 18 side-lobe jammers per frequency channel)

| Asset | Rate | Qty | Link | Aggregated Bandwidth |
|---|---|---|---|---|
| Global Hawk | ½ XCDL | 3 | Trunked Out of Theater | 2877 MHz |
| Global Hawk | 15 Mbps | 18 | Trunked Out of Theater | 1890 MHz |
| STT | 5 Mbps | 9 | Trunked Out of Theater | 315 MHz |
| SNE (FDM) | 1.0 Mbps | 50 | Trunked Out of Theater | 918 MHz |

Table 3: Triad System: 50-50% Contested-Benign: All High Power Wide Beam Jammers (50% Precision Targeting ABF Processing) (Max 20 known fixed jammers in main beam and side lobes per frequency channel)

| Asset | Rate | Qty | Link | Aggregated Bandwidth |
|---|---|---|---|---|
| Global Hawk | 50 Mbps | 3 | Trunked Out of Theater | 1,050 MHz |
| Global Hawk | 1XCDL | 12 | Intra-Theater | 3,000 MHz |
| STT | 25 Mbps | 5 | Trunked Out of Theater | 875 MHz |
| SNE (FDM) | 2.5 Mbps | 903 | Intra-Theater | 2712 MHz |

Table 4: Triad System: 100% Contested, Combo of Cognitive Peer, High Pwr Narrow & Wide Beam Jammers (Requires Regional Targeting ABF / Precision Targeting ABF / MUD iterative processing across all used freq channels)

| Asset | Rate | Qty | Link | Aggregated Bandwidth |
|---|---|---|---|---|
| Global Hawk | 15 Mbps | 4 | Trunked Out of Theater | 420 MHz |
| Global Hawk | 7 Mbps | 3 | Trunked Out of Theater | 147 MHz |
| STT | 4.7 Mbps | 5 | Trunked Out of Theater | 197 MHz |
| SNE (FDM) | 68 kbps | 65 | Trunked Out of Theater | 1186 MHz |

FIG. 11

| U/L Beam Aperture Diameter (in) | RF Power (Watts) | Beam width (deg) | Clear Air & MBA Center Feed Focused on User (Mbps) Prot / Unprot | Clear Air & user in MBA's triple point (Mbps) Prot / Unprot | Heavy Rain & MBA Center Feed Focused on User (Mbps) Prot / Unprot | Heavy Rain & user in MBA's triple point (Mbps) Prot / Unprot |
|---|---|---|---|---|---|---|
| 6 | 5 | 4.8 | 0.25 / 0.5 | 0.12 / 0.25 | 0.01 / 0.02 | 0.005 / 0.01 |
| 6 | 10 | 4.8 | 0.5 / 1.0 | 0.25 / 0.5 | 0.02 / 0.04 | 0.01 / 0.02 |
| 12 | 20 | 2.4 | 4.0 / 8.0 | 2.0 / 4.0 | 0.15 / 0.3 | 0.075 / 0.15 |
| 12 | 40 | 2.4 | 8.0 / 16.0 | 4.0 / 8.0 | 0.4 / 0.7 | 0.2 / 0.35 |
| 18 | 48 | 1.6 | 20 / 40 | 10 / 20 | 0.8 / 1.6 | 0.4 / 0.8 |
| 18 | 64 | 1.6 | 24 / 48 | 12 / 25 | 1.3 / 2.5 | 0.6 / 1.25 |
| 24 | 64 | 1.2 | 45 / 89 | 23 / 45 | 2.0 / 4.0 | 1.0 / 2.0 |
| 24 | 108 | 1.2 | 89 / 128 | 35 / 70 | 3.0 / 6.0 | 1.5 / 3.0 |
| 30 | 128 | 1.0 | 274 | 138 | 11 | 6.0 |
| 36 | 240 | 0.8 | 548 | 274 | 30 | 15 |
| 48 | 400 | 0.6 | >548 | >548 | 45 | 23 |

| U/L Beam Aperture Diameter (m) | RF Power (Watts) | 2020 Asset Examples | Worse Case Qty Supported With User in MBA's Triple Point, Clear Air Protected / Unprotected *** | Worse Case Qty Supported With User in MBA's Triple Point, Heavy Rain *, Protected / Unprotected *** |
|---|---|---|---|---|
| 6 | 10 | PGS *, MDA BLOS Interceptor BDA Officer * | 30 @ 0.25 Mbps / 90 @ 0.5 Mbps | 30 @ 0.01 Mbps / 90 @ 0.02 Mbps |
| 12 | 40 | Surface OOTH, Truck Launched UAVs, Shadow, F-35 | 90 @ 4.0 Mbps / 270 @ 8.0 Mbps | 90 @ 0.2 Mbps / 270 @ 0.35 Mbps |
| 18 | 64 | Surface OOTH, Truck Launched Small UAVs, Hunter Killer | 90 @ 10 Mbps / 90 @ 23 Mbps | 90 @ 0.63 Mbps / 90 @ 1.25 Mbps |
| 24 | 100 | Medium Sized UAVs, Predator | 15 @ 35 Mbps / 45 @ 50 Mbps | 15 @ 1.5 Mbps / 45 @ 3.0 Mbps |
| 30 | 120 | Medium Sized UAVs, Avenger | 12 @ 138 Mbps | 12 @ 6 Mbps |
| 36 | 240 | Large Sized UAVs, Reaper | 12 @ 274 Mbps | 12 @ 15 Mbps |
| 48 | 450 | Global Hawk, BAMS | 12 @ 548 Mbps | 12 @ 23 Mbps |

GEOSYNCHRONOUS TRIADS COMMUNICATIONS SYSTEM

CROSS-REFERENCE TO RELATED APPLICATIONS

This application claims the benefit of priority under 35 U.S.C. §119 from U.S. Provisional Patent Application 61/472,572 filed Apr. 6, 2011, which is incorporated herein by reference in its entirety.

STATEMENT REGARDING FEDERALLY SPONSORED RESEARCH OR DEVELOPMENT

Not applicable.

FIELD OF THE INVENTION

The present invention generally relates to satellite communications systems, and more particularly to a geosynchronous triads communications system.

BACKGROUND

The threat of adaptive jammers affecting airborne intelligence surveillance and reconnaissance (AISR) communications reachback creates challenges that conventional satellite communications systems may not be capable of managing. For example, conventional methods for protecting military satellite communications systems are limited to spreading friendly signals, increasing the dynamic range of receiver analog to digital converters (ADCs), and adaptive nulling on-board single satellite communications platforms.

Additionally, conventional satellite communications systems may not be capable of satisfying the demand for wideband (beyond the line of sight) and AISR communications reachback, because: a) frequency hopping spread spectrum systems utilize bandwidth to achieve spreading gain, which may result in lack of sufficient bandwidth for achieving wideband applications; b) dynamic ranges of current military satellite communications systems are insufficient to demodulate friendly data in a saturated environment from adaptive jammers; and c) single satellite communications hosted nullers eliminate friendly users in relatively close proximity to enemy jammers.

Improvements in satellite communications bandwidth in contested environment and the ability to collect low power friendly emitters among co-channel interferers are desired.

SUMMARY

In some aspects, a satellite communication system for airborne and reachback communications is described. The satellite communication system may comprise a formation orbiting in one or more slots of a geosynchronous orbit. The formation may include two or more communications satellites (COMSATs) encircling a ring. Each COMSAT of the two or more COMSATs may include a communication module configured to communicate with a plurality of communications assets in a benign or contested environment. The formation may be configured to allow a first communications asset, having a dish antenna with a first configuration, to communicate independently with each of the two or more COMSATs, in a first scenario. The formation may also be configured to allow a second communications asset having a dish antenna with a second configuration to communicate simultaneously with the two or more COMSATs, in a second scenario.

In another aspect, a method for airborne and reachback communications is described. The method includes communicating from a COMSAT of a formation with one or more of a number of communications assets in a benign or contested environment. The formation may be orbiting in one or more slots of a geosynchronous orbit, and may include two or more COMSATs encircling a ring. Each of the two or more COMSATs may independently communicate with a first communications asset having a dish antenna with a first configuration, in a first scenario. The two or more COMSATs may simultaneously communicate with a second communications asset having a dish antenna with a second configuration, in a second scenario.

In yet another aspect, communication asset for airborne and reachback communications is described. The communication asset may include a communication module configured to communicate, in a benign or contested environment, with one or more COMSATs of a formation orbiting in one or more slot of a geosynchronous orbit. The formation may include two or more COMSATs encircling a ring. The communication asset may also include a dish antenna, which may be configured with a first configuration that allows the dish antenna to communicate independently with each of the at least two COMSATS in a first scenario. The dish antenna may also be configured with a second configuration to communicate simultaneously with the two or more COMSATs in a second scenario.

The foregoing has outlined rather broadly the features of the present disclosure in order that the detailed description that follows can be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein:

FIGS. 9A-9G are diagrams illustrating examples of users, satellite and jammers beam settings in various benign and contested communication scenarios, according to certain embodiments;

FIG. 11 is a set of tables each illustrating an example of various assets that can be supported by the triad system under various conditions, according to certain embodiments;

FIGS. 12A-12C are tables illustrating asset reachback data rates for various apertures, powers and beam widths in a number of weather conditions, according to certain embodiments.

DETAILED DESCRIPTION

Figure 1A:
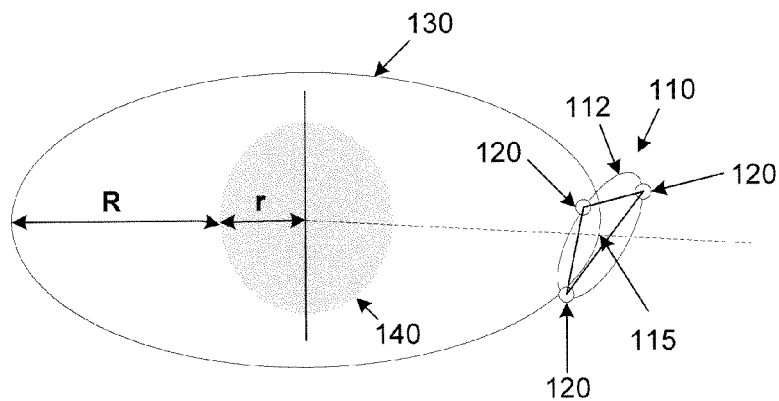
FIG. 1A is a diagram illustrating an example triad formation orbiting in geosynchronous orbit, according to certain embodiments.

The present disclosure is directed, in part, to a satellite communication system for airborne and reachback communications. The satellite communication system may comprise a formation orbiting in one or more slots of a geosynchronous orbit. The formation may include two or more communications satellites (COMSATs) (e.g., a triad formation including three COMSATS) encircling a ring. Each COMSAT of the two or more COMSATs may include a communication module configured to communicate with a plurality of communications assets (e.g., ground communication sites and terminals, beacons, airborne communication devices such as communication devices onboard flying objects including aircrafts, etc.) communication in a benign (e.g., without any interferers or jammers) or contested (e.g., with any number of interferers or jammers such as swept and broadband jammers) environment. The formation may be configured to allow a first communications asset having a dish antenna with a first configuration (e.g., with certain dish aperture size and beam angle) to communicate independently with each of the two or more COMSATs (e.g., the triad), in a first scenario. The formation may also be configured to allow a second communications asset having a dish antenna with a second configuration to communicate simultaneously with the two or more COMSATs, in a second scenario.

In an aspect, a communication asset for airborne and reachback communications may include a communication module configured to communicate, in a benign or contested environment, with one or more COMSATs of the formation orbiting in one or more slot of a geosynchronous orbit, the formation including at least two COMSATs encircling a ring and viewing the same theater area of coverage. The communication asset may also include a dish antenna, which may be configured with a first configuration that allows the dish antenna to communicate independently with each of the at least two COMSATs, in a first scenario. The dish antenna may also be configured with a second configuration to communicate simultaneously with the two or more COMSATs, in a second scenario.

According to various aspects of the subject technology, methods and systems for achieving wideband communications in a contested environment are provided. In some aspects, the systems and methods may utilize a combination of sparse aperture, multiuser detection (MUD) processing, and SATCOM formation flying, to achieve a protected wideband communications system. In one aspect, the system may achieve wideband communications in a contested environment while simultaneously providing a communications bandwidth multiplier within a given geosynchronous orbital slot and collecting friendly low-power emitters among co-channel interferers which are magnitudes greater in power.

MUD may deal with the optimal detection of mutually interfering digital streams of information that occur in various military and commercial communications systems, based on time division multiple access (TDMA), frequency division multiple access (FDMA), code division multiple access (CDMA), etc. MUD may comprise the intelligent estimation and demodulation of transmitted bits in the presence of Multiple Access Interference (MAI). MAI occurs in multi-access communication systems (CDMA, TDMA, FDMA, etc.) where simultaneously occurring digital streams of information may interfere with each other. In military satellite and terrestrial communications systems, MAI can be either multiple intentional interferences, such as jammers or it may be unintentional multiple interference, such as friendly self interference. Conventional satellite or ground detectors based on the matched filters may just treat the jamming and other interference as additive white Gaussian noise (AWGN). However, unlike AWGN, Multiple Access Interference (i.e., jamming) may have a correlative structure that is quantified by the cross-correlation matrix of the signature sequences. Hence, MUD detectors that take into account this correlation may perform better than conventional matched filter-banks. MUD algorithms may simultaneously detect the transmitted symbols of all active user terminals e.g., various jammers). Multiuser detection can be either optimal or suboptimal. Suboptimal multiuser detection algorithms can be classified into linear and interference cancellation type algorithms. The MUD and the beam forming detector used in the subject technology belong to both categories (e.g., optimal and suboptimal).

In one aspect, each communications satellite may have the capability to communicate with different assets, wherein each asset is assigned to one of a plurality of satellites within a single orbital slot. In this example, a bandwidth multiplier effect per COMSAT slot may be achieved. In another aspect, each communications satellite may have the capability to communicate with other assets while simultaneously communicating with more than one satellite in the same orbital slot(s). In this example, protection capability may be achieved. Specifically, the communication satellites may receive an over-illuminated (uplink beam) signal, gather and beamform (e.g., via processing on-board or via ground based beamform processing) to generate a composite image of a number of friendly terminal(s).

Optimal MUD with unknown number of active friendly users (e.g., communication sites or terminals) and jammers may require simultaneous estimation of the active sites including parameters associated with each site and data transmitted by each site from composite images. Maximum likelihood sequence detection using recursive least squares detections can iteratively realize the hypothesis of the friendly users distinguished from the jammers. While MUD processing may provide high probability likelihood knowledge and angle-of-arrival information of the friendly user signature waveforms as well as the jammers, the application of the sparse aperture eigen beam vector method can be used to suppress the jammers. In some aspects, this method may be able to suppress high power and adaptive jammers microradians off axis from the friendly terminals with performance values orders of magnitudes better than existing nullers, while preserving wideband transmissions.

In some aspects of the subject technology, systems and methods may utilize a combination of sparse aperture, MUD processing, and SATCOM formation flying, to achieve a protected wideband communications system.

In some aspects, the subject technology may provide a next generation solution to both wideband and protected communications. A system of the subject technology may iterate sparse aperture recombination (SAR) and MUD processing to achieve protected wideband capacities at rates comparable to 274 Mbps communication data link (CDL) in the midst of 150 dBW (or greater) full band jammers. The system may achieve protected wideband capacities at rates up to 54 Gbps with a combination of 3 COMSATs in the same orbital slot (e.g., a triad formation)

FIG. 1A is a diagram illustrating an example triad formation 110 orbiting in geosynchronous orbit 120, according to certain embodiments. Triad formation 110 may include three COMSATs 120 forming a triad configuration with each COMSAT 120 positioned at a corner of an equilateral triangle with a centroid 115 (e.g., geosynchronous triad centroid). In some aspects, a satellite formation may include two or more COMSATs. Triad COMSATs 120 encircle a ring 112, which may have a nearly circular shape with predetermined diameter (e.g., approximately 750 kilometers). Triad formation 110 may fly in one or more orbital slots (e.g., approximately from −2.0 deg. to +2 deg.) of a geosynchronous orbit 130 at an altitude R (e.g., geosynchronous altitude at 36,371 km) above the Earth 140 (with radius r=6378 km). The configuration of triad formation 110 allows certain communication assets to communicate independently with each of the satellites of triad COMSATs 120, and therefore benefit from three times larger bandwidths in a benign environment. The configuration also allows certain other communication assets to communicate simultaneously with the three satellites of triad COMSATs 120 and enjoy a protected mode of communication in a contested environment.

Figure 1B:
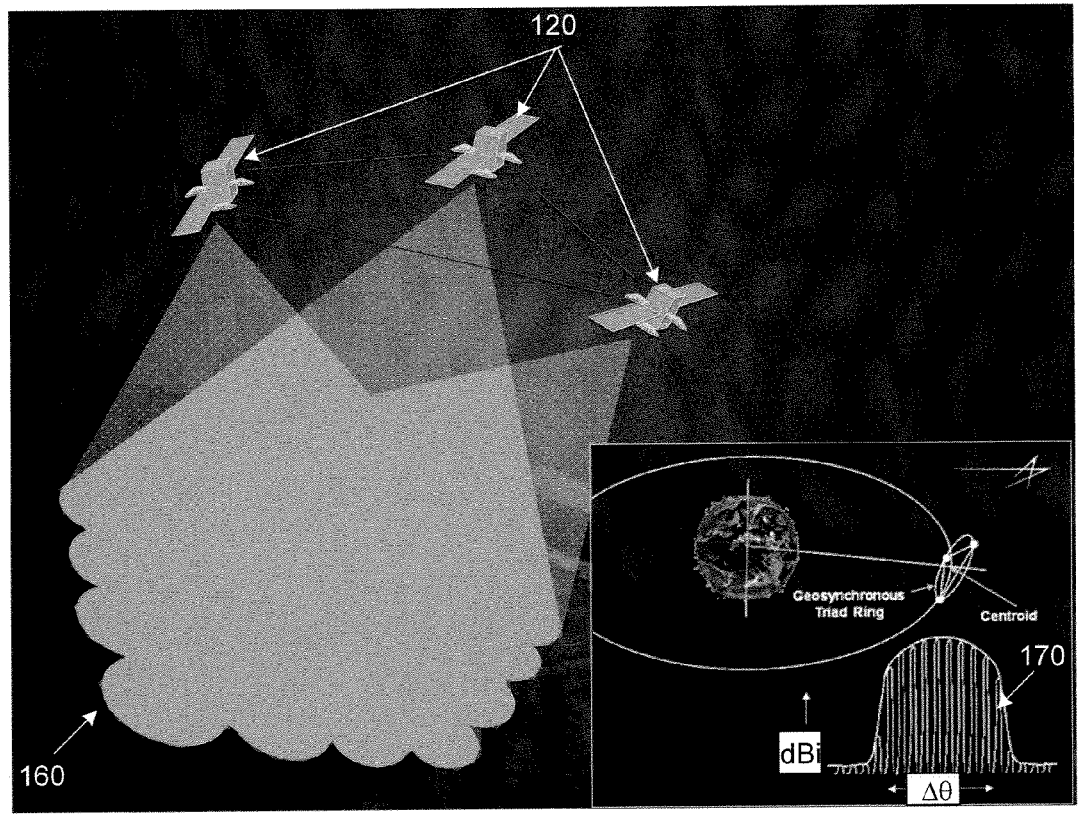
FIG. 1B is a diagram illustrating exemplary communication satellites (COMSAts) of the triad formation of FIG. 1A communicating with a number of communication assets, according to certain embodiments.

FIG. 1B is a diagram illustrating exemplary communication satellites (COMSATs) of the triad formation of FIG. 1A communicating with a number of communication assets, according to certain embodiments. Triad COMSATs 120 may be positioned such that all three COMSATS view a common theater 160 of coverage. The communication assets within the theater 160 may be able to communicate with triad COMSATs 120. The way that the satellites of triad COMSATs 120 fly is with the inclination twice the eccentricity (i=2 e). This may indicate that if the satellites are flying west to east, the perigee path formed by the very bottom of ring 112, for a counter-clockwise i=2e rotation, is in the southern hemisphere. The apogee path, formed by the very top of ring 112, is higher than perigee. The plane of ring 112 may form a 26° look angle above the equator. So, basically, the circle may look perfect at 260 above the equator.

The interference of the electromagnetic waves emitted by triad COMSATs 120 may form a pattern 170 with a width $\Delta\theta$ resembling grating pattern of an optical grating, and including a number of intensity maxima and minima shown in dBi units. The interference pattern 170 allows for nulling jammers by locating them in the minimum intensity portions of the interference pattern as will be discussed in more detail herein. This will allow a protected mode of communication between friendly active users and triad COMSATs 120 in a contested environment. For a single satellite, only the coarse lobe formed by the envelope of the interference pattern 170 may exist, that provides a coarse resolution, indicating that the assets within the coarse lobe are not resolved.

Figure 2:
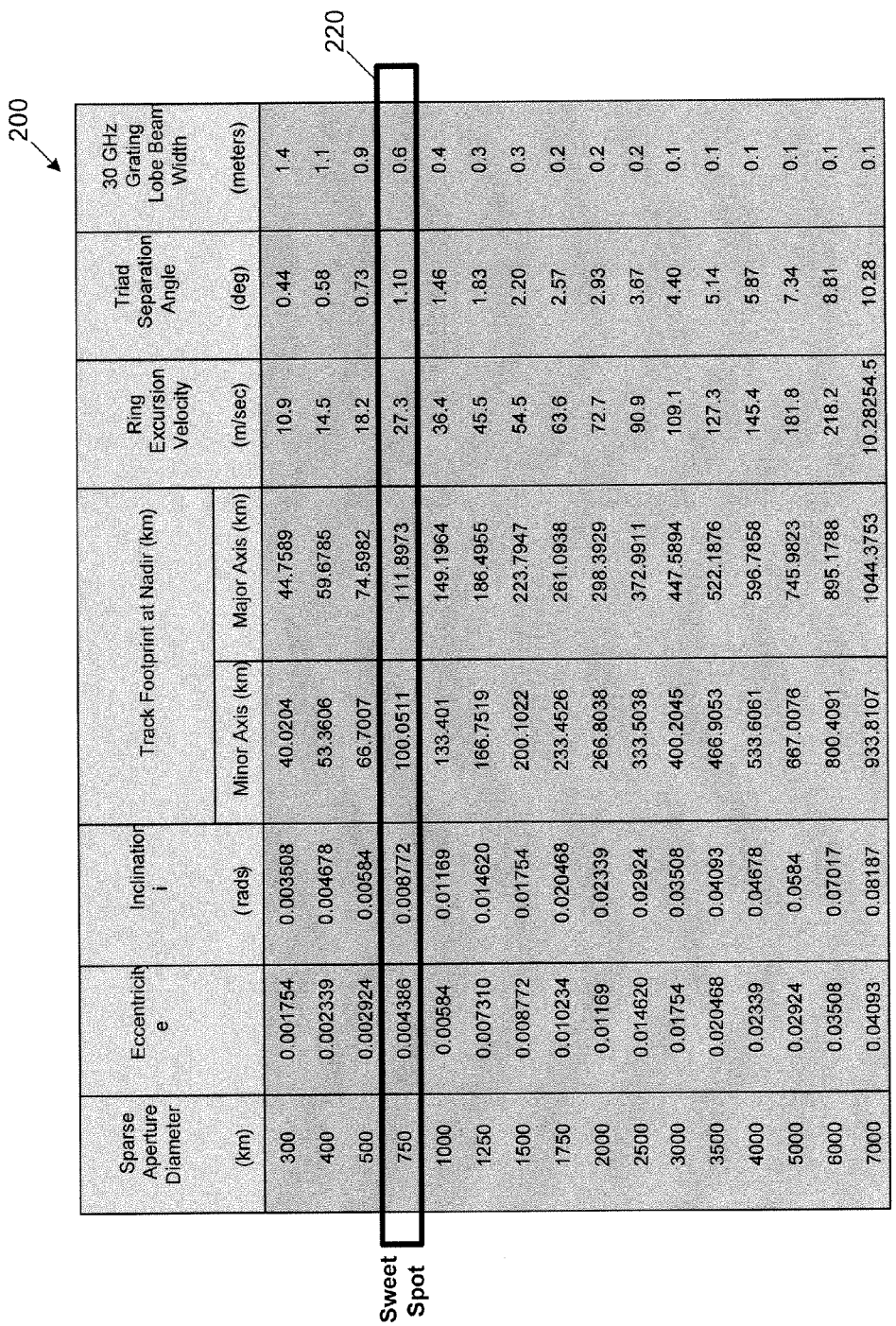
FIG. 2 is a table illustrating exemplary parameters for various possible sparse aperture diameters of the triad formation of FIG. 1A and a selected sparse aperture diameter, according to certain embodiments.

FIG. 2 is a table 200 illustrating exemplary parameters for various possible sparse aperture diameters of triad formation 110 of FIG. 1A and a selected sparse aperture diameter, according to certain embodiments. The sparse aperture diameter defines the diameter of ring 112 of triad formation 110. Each row of table 200, gives values for a number of other parameters of triad formation 110, for example, Eccentricity (e), inclination (i), track footprint at nadir (km), ring excursion velocity, triad separation angle and lobe beam width (at 30 GHz operating frequency). The numbers in table 200 represent i=2e, which specifies that for all configurations listed in table 200, the value of eccentricity (e) is twice the value of inclination (e) parameter.

The inclination parameter i in radians is defined as: i=D/2 (r+R), where D represents the sparse aperture diameter (i.e. the diameter of ring 112 of FIG. 1A) and r and R are the Earth radius and altitude of the orbit 130, respectively, as shown in FIG. 1A. The sweet spot in the table 200 is row 220, which gives a sparse aperture diameter D=750 km and defines a configuration for triad formation 110 characterized by i=750/2(6378+36371)=0.008772 and e=i/2=0.004386. The track footprint at nadir is represented by two parameters: 1) major axis satellite track at earth surface=2.i.r; and 2) minor axis satellite track at earth surface=2.i.r cos($\phi$), where $\phi$=26.6 degrees or 26.6/57.29=0.464 radians. The grating lobe beam width, $\Delta\theta$ (in degrees)=2.360/(2$\pi$.a sin(1.85 C/(F))/$\pi$D)), from which grating lobe footprint diameter (in meters) can be calculated. Grating lobe footprint diameter (in meters)=$\Delta\theta$.(r+R), where $\Delta\theta$ is in radians and r and R are expressed in meters.

Figure 3A:
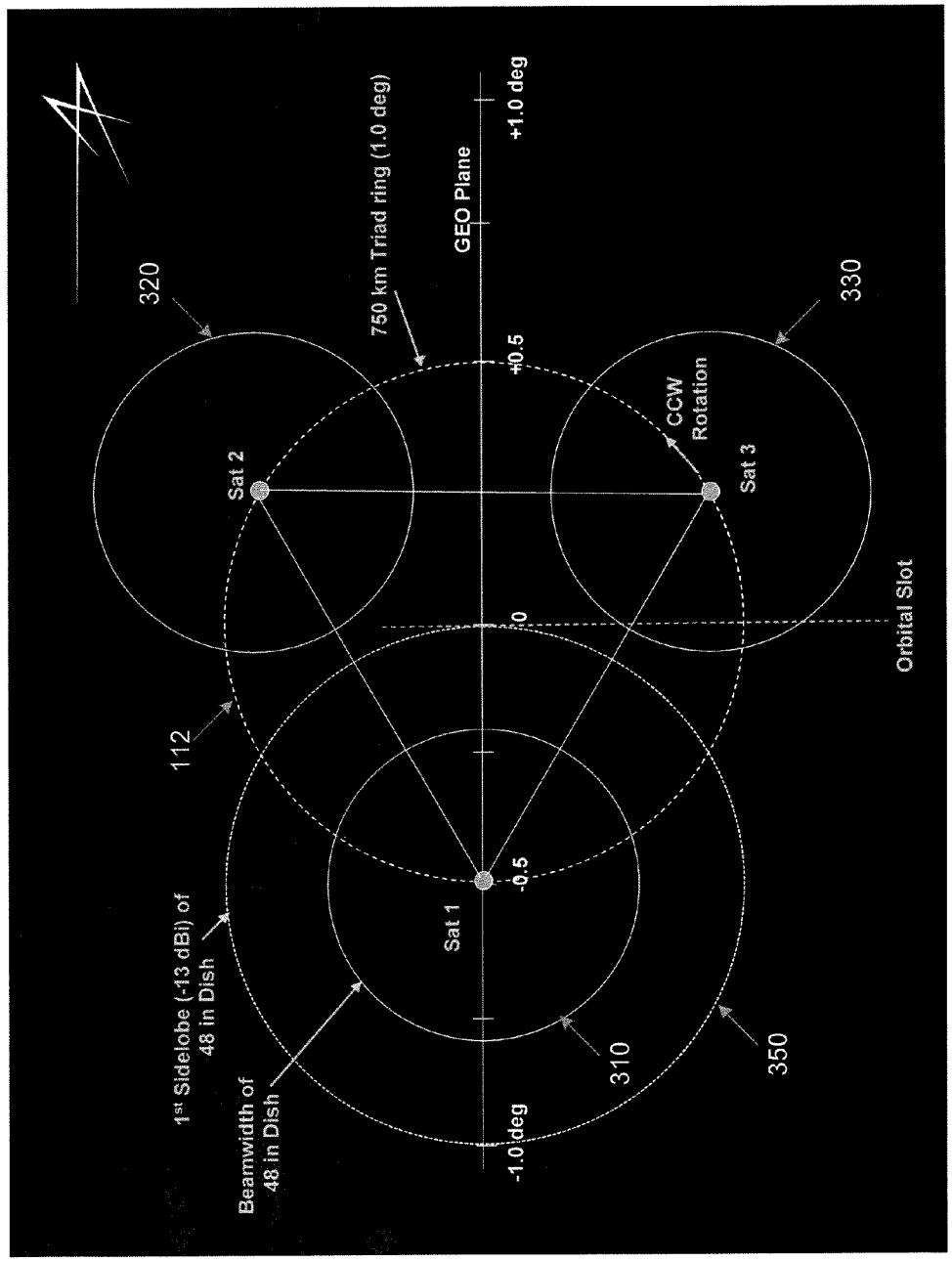
FIGS. 3A-3C are diagrams illustrating exemplary uplink beam overlays for communication assets with different dish apertures communicating with the COMSATs of the triad formation of FIG. 1A, according to certain embodiments.
Figure 3B:
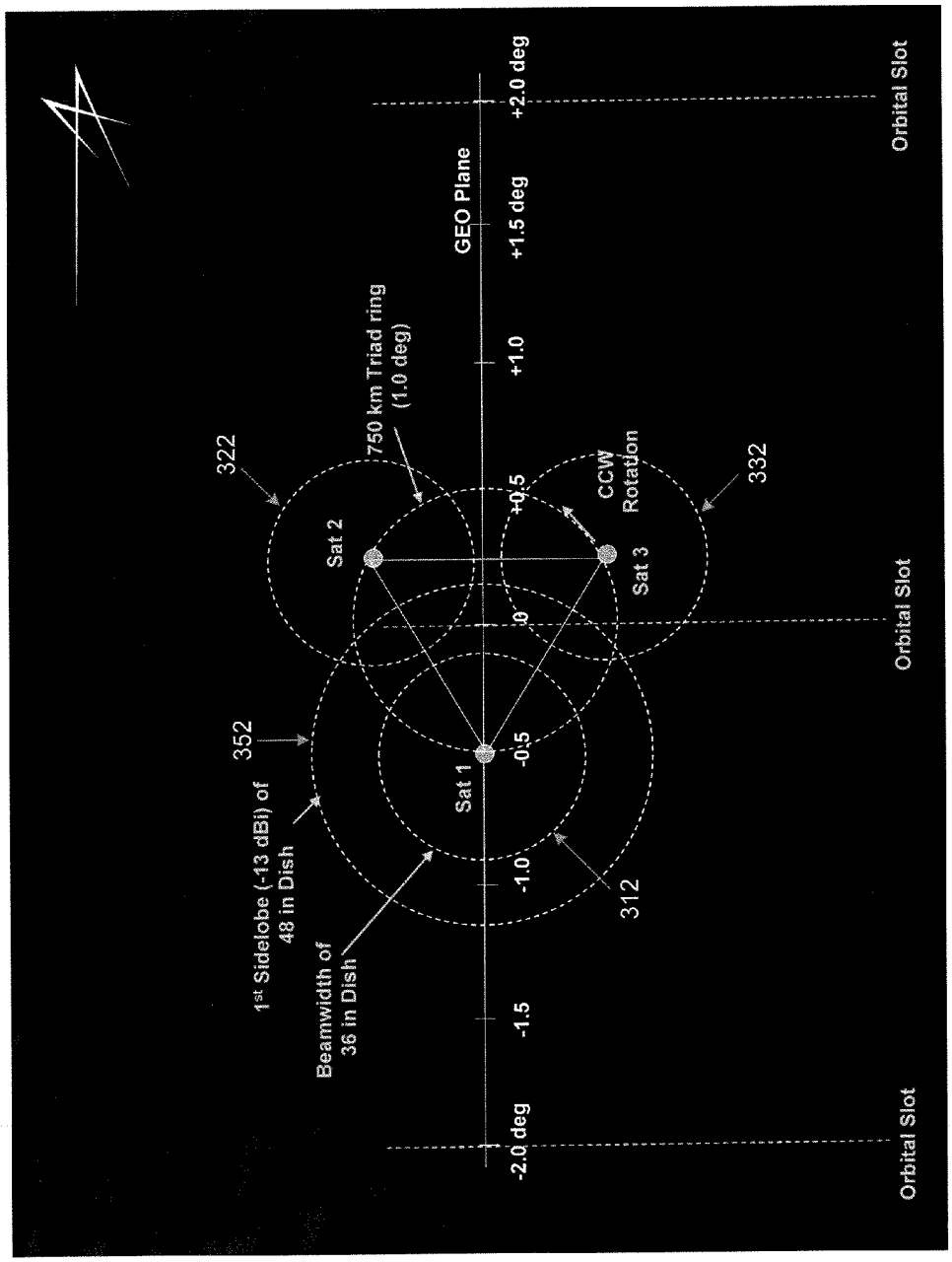
Figure 3C:
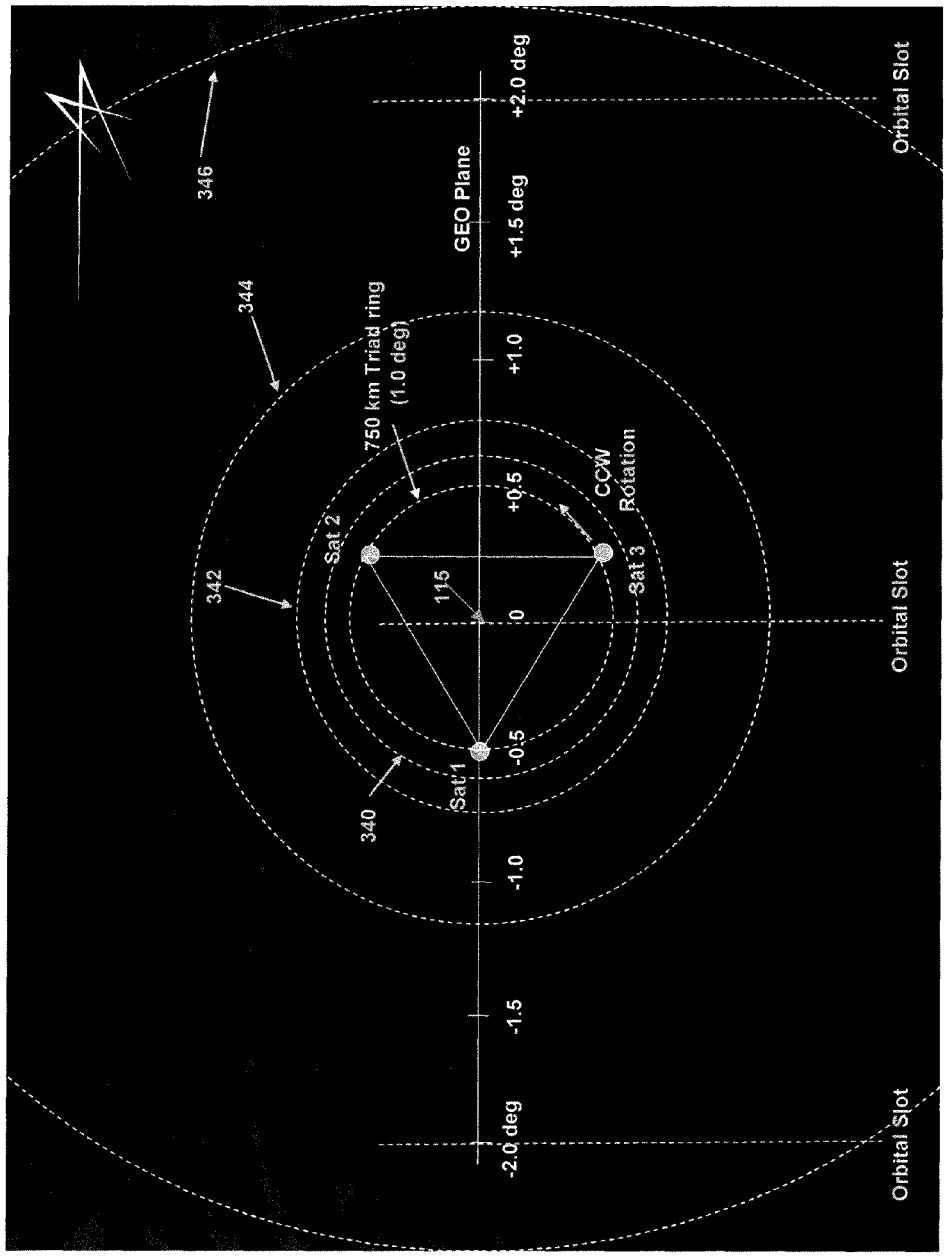

FIGS. 3A-3C are diagrams illustrating exemplary uplink beam overlays for communication assets with different dish apertures communicating with the COMSATs of the triad formation 110 of FIG. 1A, according to certain embodiments. As seen from FIGS. 3A-3C, triad COMSATs 120 (shown as Sat1, Sat2, and Sat3) form the ring 112 with the diameter of 750 km, which as mentioned above, corresponds to the sweet spot row 220 of table 200 of FIG. 2, and are positioned in the middle of two orbital slots each having a width of 2 degrees. FIG. 3A corresponds to uplink beam overlays for communication assets with dish apertures of approximately 4 ft when communicating with satellites of triad COMSATs 120 of FIG. 1B. For such communication assets with 4-ft dish aperture, the uplink beam widths are represented with rings 310, 320, and 330 surrounding satellites Sat1, Sat2, and Sat3, respectively, without interfering. This indicates an advantage of the chosen configuration (e.g., sweet spot row 220 of FIG. 2) of triad COMSATs 120, which allows high data rate communication assets with 4-ft dish to benefit from three times uplink bandwidth multiplication, by pointing their beams to each of the three satellites Sat1, Sat2, and Sat3, therefore, independently communicating with each of the three satellites. The ring 350 indicates a representative first sidelobe at −13 dB (e.g., the first knoll), which provides satellites Sat1, Sat2, and Sat3 with protection against inter-satellite interferences.

FIG. 3B corresponds to uplink beam overlays for communication assets with dish apertures of approximately 3 ft when communicating with satellites of triad COMSATs 120 of FIG. 1B. The smaller dish aperture translates to a larger beam width for 3-ft dish as compared to 4-ft dish. As seen from FIG. 3B, rings 312, 322, and 332 representing uplink beam widths corresponding to the communication assets with 3-ft dish do not overlap. This indicates that even high data rate communication assets with 3-ft dish can benefit from three times uplink bandwidth multiplication, by independently communicating with each of the three satellites Sat1, Sat2, and Sat3. It is interesting to see that the ring 352 representing the first knoll does not spill over the other satellites (e.g., Sat2 and Sat3).

FIG. 3C corresponds to uplink beam overlays for communication assets with dish apertures less than 3 ft when communicating with satellites of triad COMSATs 120 of FIG. 1B. The smaller dishes may belong to communication assets such as unmanned airborne vehicles (UAVs) or satellite terminals on the ground. In the scenario of FIG. 3C, communication assets with small uplink dishes (e.g., with diameters less than 3 ft, such as 24, 18, 12 and 6 in) are focusing their beams on the center of the triad formation, and can not view the three satellites Sat1, Sat2, and Sat3 individually. This is because their corresponding uplink beam widths represented by rings 340 (e.g., for uplink 24 in dish), 342 (e.g., for uplink 18 in dish), 344 (e.g., for uplink 12 in dish), and 346 (e.g., for uplink 6 in dish) cover the three satellites Sat1, Sat2, and Sat3. The grating lobes of the three satellites allows nulling certain jammers as will be discussed herein, therefore providing the communication assets with smaller dish apertures (e.g., friendly active users) protection against various jammers. The three satellites Sat1, Sat2, and Sat3 are shown to have a counter clockwise (CCW) rotation around the geosynchronous triad centroid 115.

Figure 4:
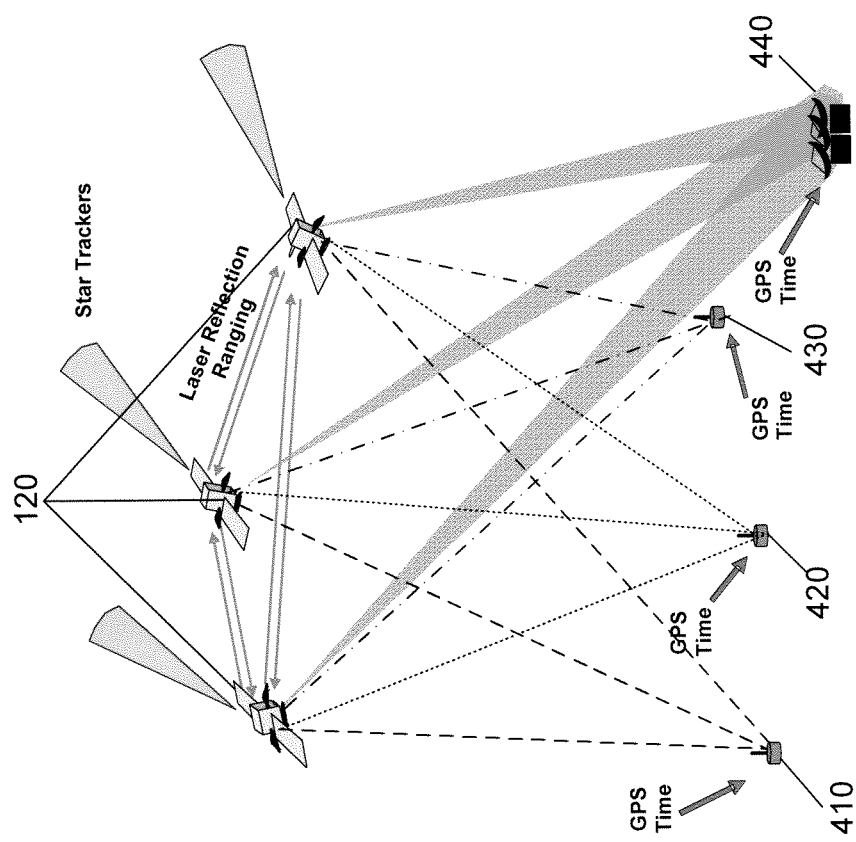
FIG. 4 is a diagram illustrating an exemplary arrangement for measuring location of COMSATs of FIG. 1B to enable precision beam pointing, according to certain embodiments.

FIG. 4 is a diagram illustrating an exemplary arrangement for measuring location of triad COMSATs 120 of FIG. 1B to enable precision beam pointing, according to certain embodiments. In order for the communication assets to be able to precisely point their beams to satellites of the triad COMSATs 120, an accurate position and attitude of the three satellites (e.g., satellites of the triad COMSATs 120) at each point in time are to be determined. Such determination may be made in various ways. For example, star tracker modules of the satellites of triad COMSATs 120 may track certain field of stars (e.g. 13 magnitude stars) to get a good fine point for providing attitude knowledge (e.g., direction in which the satellite is pointing). The other tools that can be used to determine attitude is laser interferometrics between satellites of triad COMSATs 120. The laser interferometrics may be performed by laser reflection ranging, which also helps with determining the range between the satellites. Ground fiducials (e.g., beacons such as beacons 410, 420 and 430) may be used as reference points to the Earth's center, as their surveyed locations are known and, therefore, the known ground fiducials locations can be processed so that satellite beams can be aligned at each instance of time.

The above-mentioned three elements, i.e., the star trackers, the precision interferometric beam pattern, and the ground fiducials allow precise determination of the position of the satellites and aligning the beam over the same target with minimum search on the ground. Beacons 410, 420 and 430 can transmit global positioning system (GPS) timing to the satellites. The satellites transmit the received GPS times to ground station (GS) 440. At the GS 440, knowing the current ground time and the received GPS time, which indicates the time that the signal was sent to the satellite from the beacon (e.g., any of beacons 410, 420 and 430), the distance traveled by the signals from the beacon to the satellite and back to the GS 440 is known. So the timing information associated with the three satellites can be processed to compute the deltas between the signals transmitted from the satellites to the GS 400 and align the modulated signal phasing, so that they can be combined adaptively to suppress jammers as will be discussed below.

Figure 5:
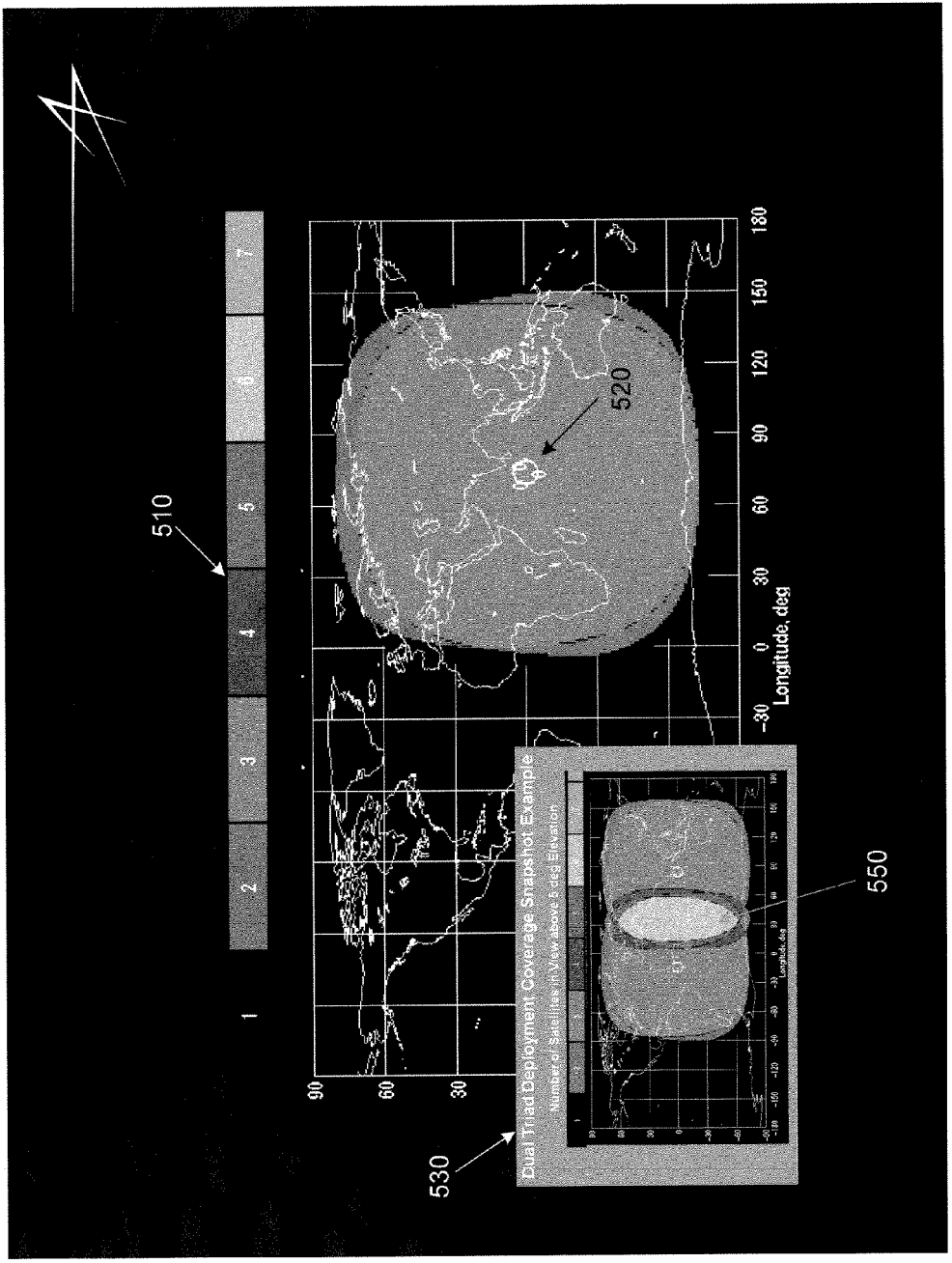
FIG. 5 is a diagram illustrating exemplary snapshots of coverage for a single and a dual triad deployment, according to certain embodiments.

FIG. 5 is a diagram illustrating exemplary snapshots of coverage for a single and a dual triad deployment, according to certain embodiments. The numbers in the tabs 510 above the map indicate the number of satellites in view above 5 degree elevation. The example shown is a triad with a 5 degree inclination and 0.04363 eccentricity and approximately 7000 km separation between satellites of the triad. Triad COMSATs 120 of FIG. 4 is seen, in the view from the ground as three small dots around the ring 520 shown in the middle of FIG. 5. The actual ring 112 of FIG. 1A, as seen has by ring 520, is demagnified by a factor of r/(r+R), where r and R are the Earth radius and geosynchronous elevation. The window 530 shows a snapshot of coverage for a dual triad deployment, where the six satellites are aimed at the same theater. So, for the communication assets located in the overlap area 550 twice as many (e.g., 20×2=40) degrees of freedom are available to make more robust operation on jammer suppression as will be discussed in more detail herein.

Figure 6:
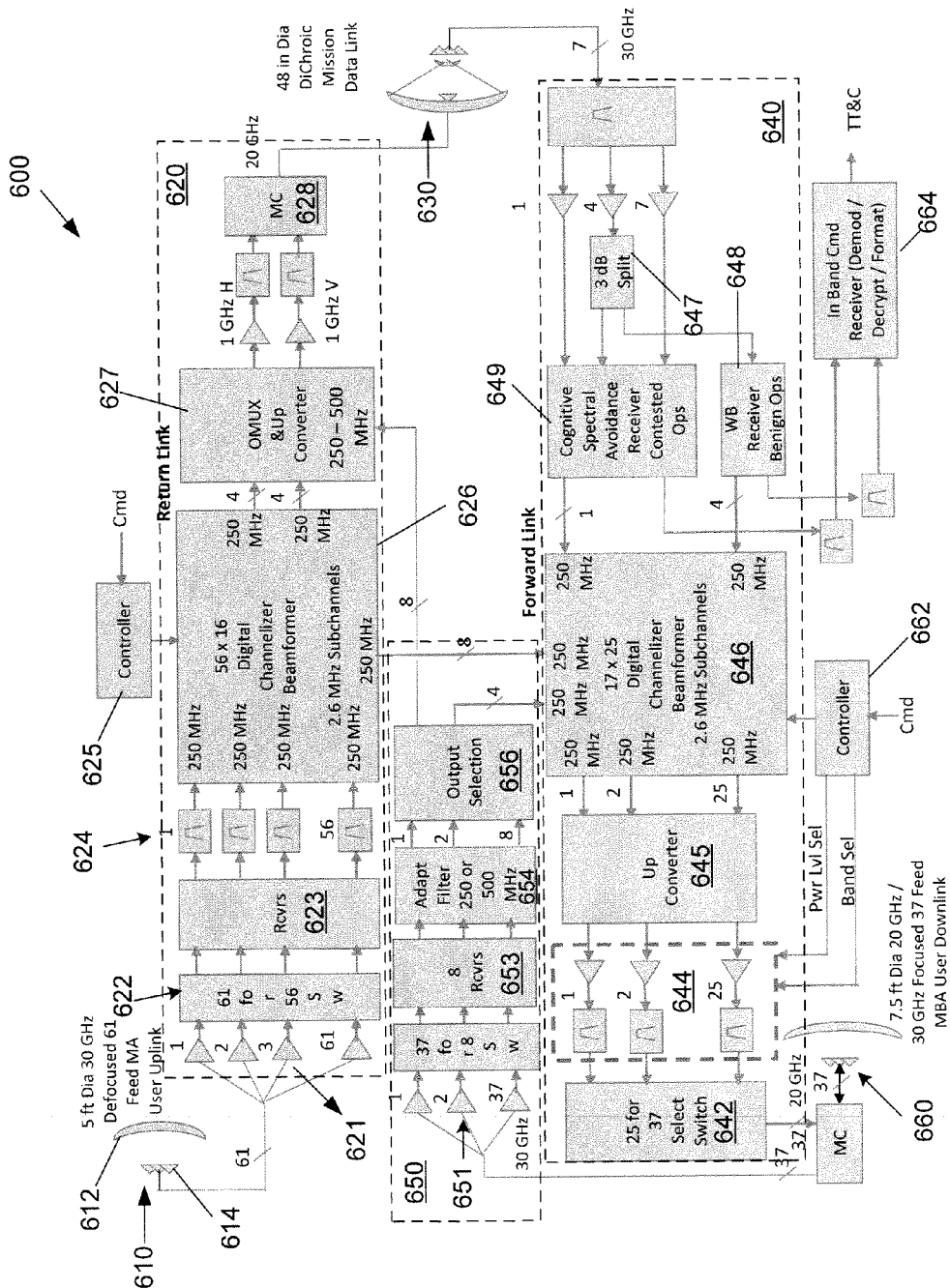
FIG. 6 is a block diagram illustrating an exemplary sparse aperture based wideband communications payload, according to certain embodiments.

FIG. 6 is a block diagram illustrating an exemplary sparse aperture-based wideband communications payload 600, according to certain embodiments. Communication payload 600 includes a satellite antenna 610, a return link 620, a mission data link 630, a forward link 640, and a backward link 650. communication payload 600 may be used on each of three identical satellites operating in an approximate i=2e orbit at geosynchronous altitude 120 degrees apart (e.g., COMSAT 120 of FIG. 4). In the "all-benign" operations mode, each satellite may be designed to operate independently as a stand-alone communications platform, providing up to 2 GHz per satellite of single hop (up to 250 MHz per channel) of full duplex or unsymmetrical Ka-band communications to/from various simultaneous users within the theater-of-conflict; and another 2 GHz per satellite of full duplex or unsymmetrical reachback to/from various simultaneous users in the theater to a common gateway. In the benign mode, the total throughput capacity for this example may be 4 GHz per satellite or 12 GHz for three satellites. In the "all-contested" communications mode, all bandwidth from all three satellites may be routed to the gateway for Regional Targeting ABF/Precision Targeting ABF/MUD processing before returning to one satellite for retransmission back into the theater (e.g., when the theater is the destination of the communication message). In some aspects, (e.g., as in AISR reachback) the data sent to the gateway may be destined to regions outside the theater. Since all three satellites may be collecting similar RF images (e.g., user data) for transmission to the gateway, and since all bandwidth may flow to the gateway, the system may be reduced to 2 GHz maximum bandwidth. Depending on the location of jammers and interferers, benign and contested "hybrid" operations may be possible, given adequate separation distances of the two operating conditions across the theater.

Returning to Communication payload 600, satellite antenna 610 may comprise a multi-beam antenna (MBA) including a reflector 612 (e.g., with a 5-ft aperture) and a 61-feed feed-horn 614. The 5-ft aperture may provide 2100× 2100 km effective field of view (EFOV) at nadir. The output of 61-feed feed-horn 614 is coupled to receivers of return link 620. Forwarded (e.g., user-to-base) or intra-theater user-to-user signals may be collected at item 610 by seven of the 61 feed MBA (e.g., a 5 foot reflector), with each of the 61 beams representing slightly overlapped footprints and, which when combined may cover the full theater of conflict (e.g., theater 160 of FIG. 2A). The seven adjacent septet of signals may be filtered for a 30-31 GHz passband and amplified at the LNA bank 621, selected at the input switch 622, forwarded to the receiver bank 623, and digitally beamformed and channelized at the Digital Channelizer beamformer block 626. At this point the received RF spectrum (e.g., at the subchannel level)

may be rearranged and either routed to the output channelizer 646, in blocks of up to 8 each 250 MHz channels, or routed to the Output Multiplexer 627 for transmission to the gateway via the output multiplexer 628 and the mission data link 630. If the signal was routed to the output Digital Channelizer Beamformer 646 from the input Digital Channelizer Beamformer 626, the user data may subsequently regrouped at the sub-channel level with uplinked gateway data, upconverter to 20-21 GHz at upconverter 645, amplified and filtered at amplifier bank 644, routed at switch 642 and returned into theater through the 7.5 foot diameter 37 feed MBA 660. Given the bandwidth and data rate limitations of the defocused 610 uplink (needed for additional degrees of processing freedom in contested operations), a second focused uplink 660 comprising 37 focused feeds may be used to provide reachback for bandwidths up to 500 MHz (e.g., high rate DVB-S2 or 2XCDL users), either intra-theater or to the gateway via an input filter LNA bank 651, receiver bank 653, adaptive filter bank 654, and the output selector 656. Information returning to theater via the gateway may be received at 630 thru the 4 foot mission data link, then split at split 647 for routing to the wideband receiver 648 before routing to the output Digital Channelizer Beamformer 646.

In an "All-Contested" operations aspect, forwarded (user-to-base) or intra-theater user-to-user signals are collected at 612 by 7 of the 61 feed MBA (e.g., 5 foot reflector), with each of the 61 beams representing slightly overlapped footprints and, when combined may cover the full theater of conflict. The seven adjacent septet of signals may be filtered for a 30-31 GHz passband and amplified at the LNA bank 621, selected at the input switch 622, forwarded to the receiver bank (623, and digitally channelized (not beamformed) at the Digital Channelizer beamformer block 626. At this point the received RF spectrum (e.g., at the subchannel level) may be spectrally arranged and either routed to the Output Multiplexer 627 for transmission to the gateway via the output multiplexer 628 and the mission data link 630. On the ground, the seven spectral images of each contested user may be processed using regional beamforming (e.g., Regional Targeting ABF), precision beamforming (e.g., Precision Targeting ABF) and discriminated from multiple co-channel interfering users (MUD). Upon return to the theater (if necessary), the data is received at all seven feeds of the 4 foot mission data link 630, processed using on-board Regional Targeting ABF and cognitive spectral avoidance processing at block 649 then forwarded to the output Digital Channelizer Beamformer 646. Command and control operations, including in-band commending, RF output power control & band selection, and channelization are performed by block 664, controller 662, and controller 625 respectively.

In an "Hybrid Contested/Benign" operations aspect, communication payload 600 may rely on spatial separation of the beams (e.g., via the MBAs) to achieve hybrid operating conditions. Depending upon the location of the interferer (e.g., jammer), benign operations can be processed in one area of the theater, while contested operations can be processed in another area. The performance of communication payload 600 may be limited to the inefficiency of the requirement for ground based beamforming for contested signals (e.g., requiring up to 7× the bandwidth to the gateway compared to processing a benign channel), and the maximum 4 GHz capacity of the channelizers.

Figure 7A:
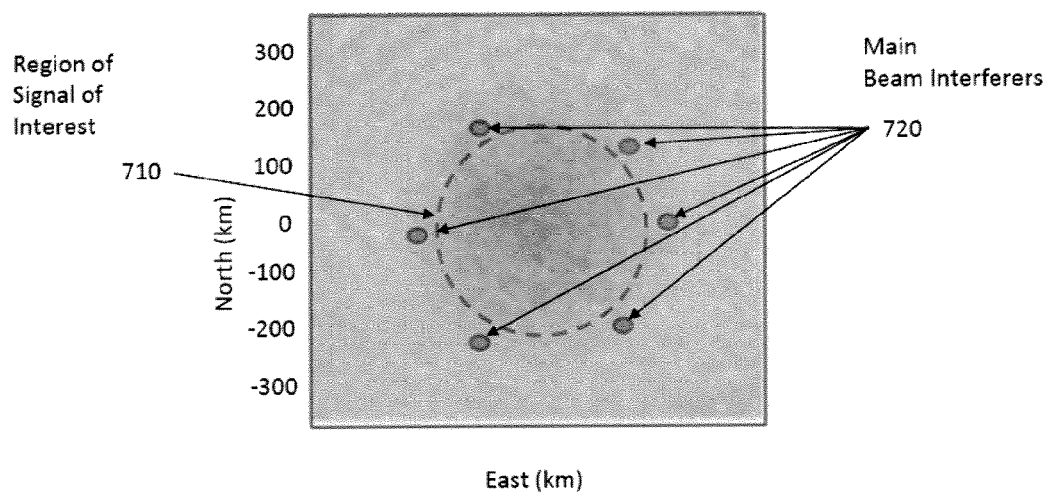
FIGS. 7A-7B are diagrams illustrating examples of interferer suppression for a single triad, according to certain embodiments.
Figure 7B:
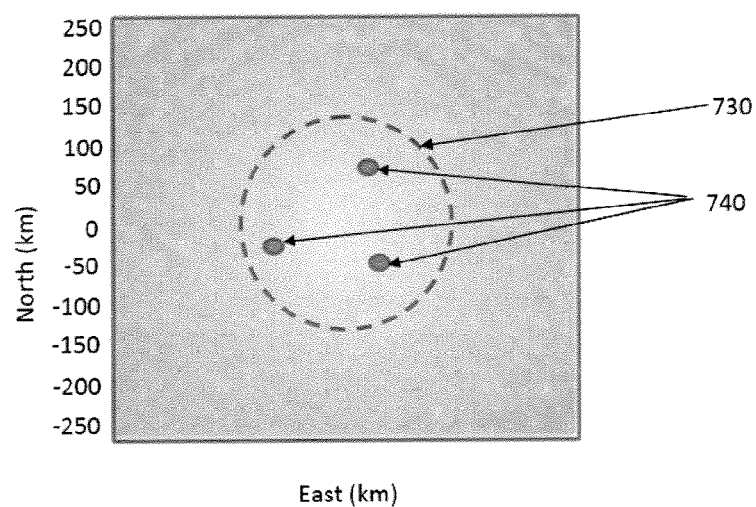

FIGS. 7A-7B are diagrams illustrating examples of interferer suppression for a single triad, according to certain embodiments. In FIG. 7A, a region of signal-of-interest 710 is shown as surrounded by a dotted ring represent a main beam of a satellite of the triad (e.g., triad COMSATs 120 of FIG. 1B). Six black dots on the periphery of the doted ring represent six interferers 720 in the uplink that may be successfully nulled to approximately −20 dB (while preserving unity gain at the center of the region of the signal-of-interest) by a single satellite. So, the three satellites of the triad can suppress up to 3×6=18 interferers. It is to be noted that with one satellite, the interferers cannot be in the main beam. FIG. 7A also shows the interaction between the grating lobes across the band. The gain/loss map has a "speckle" pattern (similar to a high-resolution SAR image) from the constructive and destructive interference of thousands of nulls and peaks. The gain on average may be noticeably less at the locations of the main-beam interferers than in the region of the signal-of-interest. Main beam interference mitigation may provide sharp nulling contours that enable practical nulling of interferers within the main part of a beam while still maintaining gain on the signal-of-interest.

FIG. 7B shows 3 interferers 740 within the region-of-interest 730 (e.g., a center beam) surrounded by a dotted ring. In this case, the center beam SNR gain is maintained and the average SNR within the center beam is degraded only slightly. Ground-based fiducials (e.g., beacons 410, 420, and 430 of FIG. 4) may be employed for calibrating array weights and beam position. The fiducials may be in-band and propagate along communications receive paths. The fiducials may also provide highly accurate calibration of "through-the-atmosphere" path length.

An initial sizing indicates that a scalable ground system may be affordably implemented. Sizing estimates may be extrapolated from field tests conducted previously, with scaling for Moore's Law and the Triad configuration. A 5-rack (e.g., 6-foot high, 19-inch rack) ground system may support a largely Regional Targeting ABF/Precision Targeting ABF/MUD based approach while a 40-rack ground system may increase support for extensive Precision Targeting ABF with the ability to mitigate a larger quantity of more complex interferers. Future detailed trades may characterize performance for specific scenarios. Mitigation of over 1000 interferers may be accomplished depending on bandwidth, interferer-density, relative distances between the interferers, the signal being protected, as well as on protected-signal and interferer motions.

Figure 8:
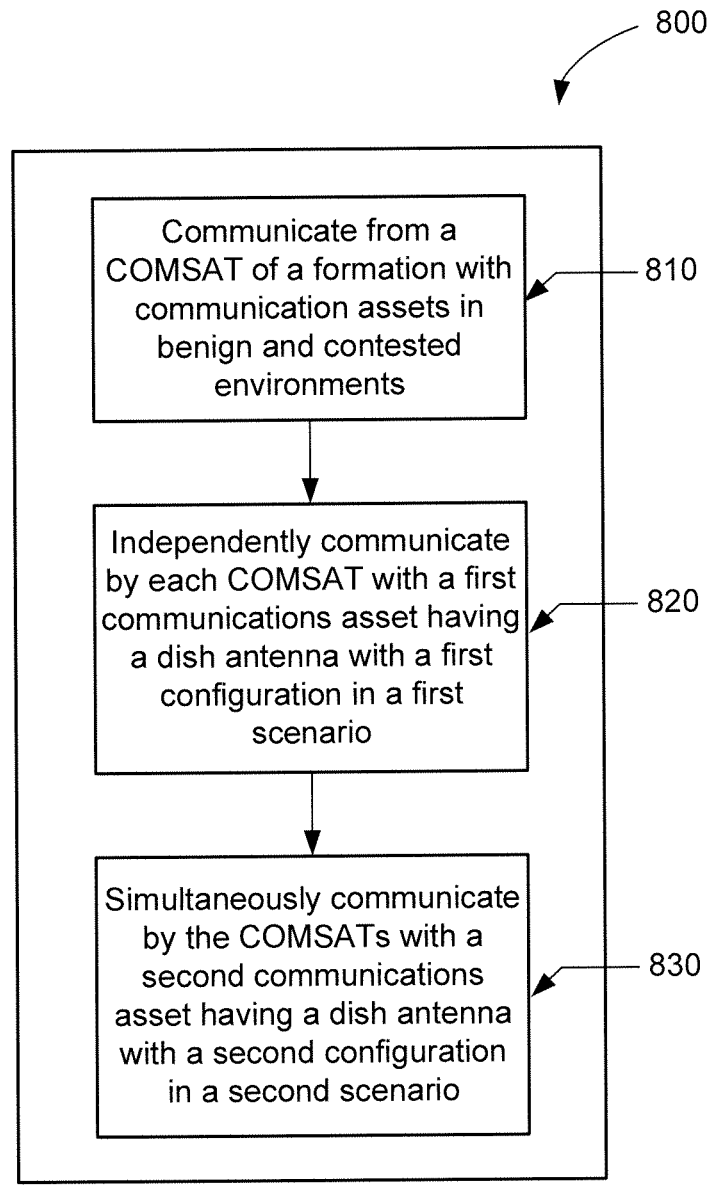
FIG. 8 is a flow diagram illustrating an example method for airborne and reachback communications, according to certain embodiments.

FIG. 8 is a flow diagram illustrating an example method 800 for airborne and reachback communications, according to certain embodiments. Method 800 starts at operation 810, where a COMSAT of a formation (e.g., on of the triad COMSATs 120 of FIG. 1B) communicates with one or more communications assets in a benign or contested environment of the theater 160 of FIG. 1B. The formation may be orbiting in one or more slots of a geosynchronous orbit and may include at least two COMSATs encircling a ring (e.g., ring 112 of FIG. 1A). In a first scenario, each of the two or more COMSATs of the formation may independently communicate with a first communications asset having a dish antenna with a first configuration (e.g., a dish antenna aperture equal or greater than 4 feet and a beam directed to one of the at least two COMSATs) (operation 820). In a second scenario, a second communications asset having a dish antenna with a second configuration (e.g., a dish antenna aperture less than 3 feet and a beam directed to the center of the formation) may communicate simultaneously with the at least two COMSATs (operation 820).

Figure 9G:
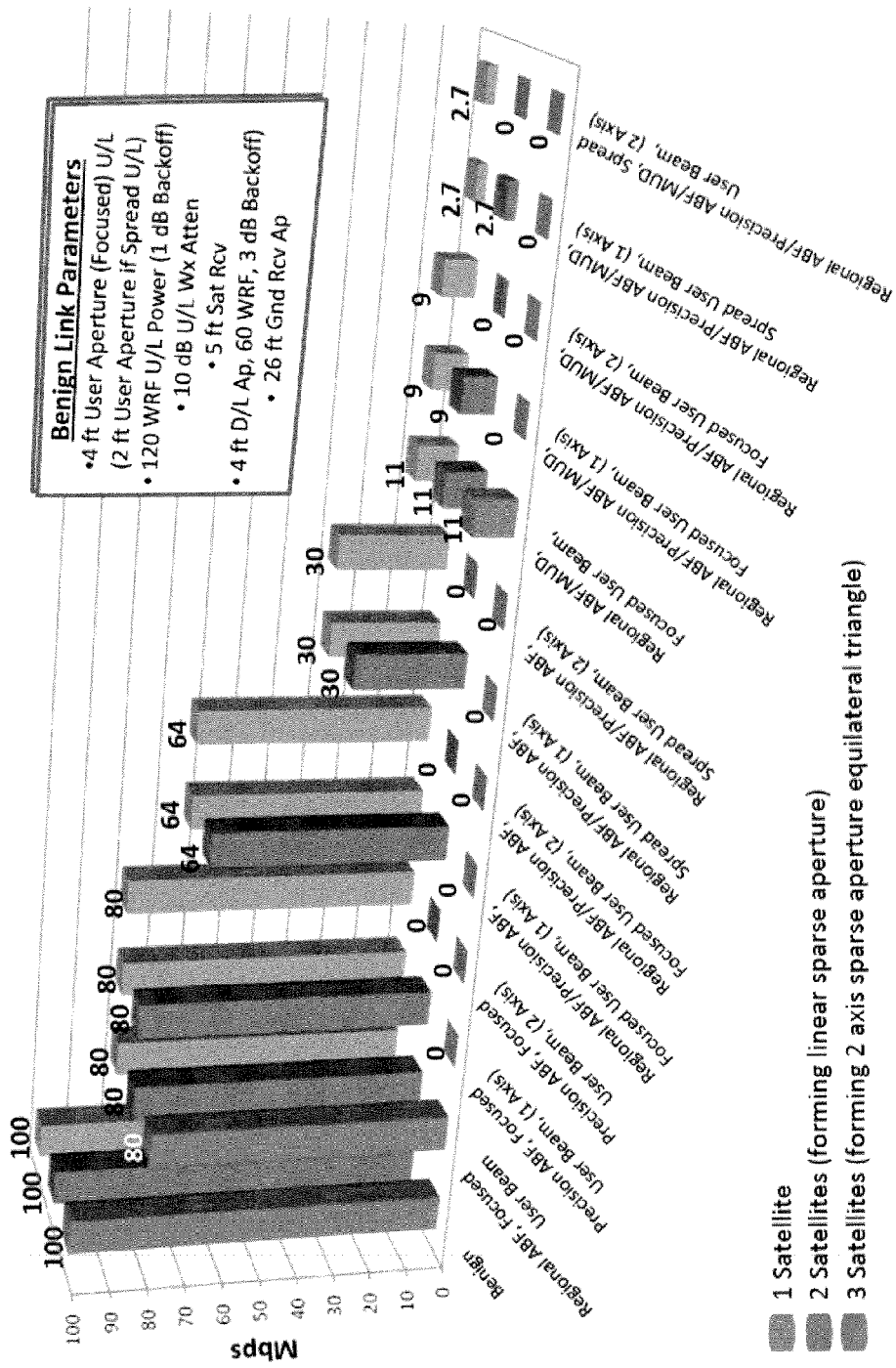

FIGS. 9A-9G are diagrams illustrating examples of users, satellite and jammers beam settings in various benign and contested communication scenarios and corresponding various signal processing techniques, according to certain embodiments. In FIGS. 9A-9F, a middle line 910 represents a user uplink, a broader curve 920 shows a satellite return link ground footprint, and a side curve 930 depicts a sidelobe. The communication scenarios depict the benign and contested performances for a single SOI under various levels of interference. FIG. 9A depicts a benign condition with focused user beam on single satellite, in which triad channelizes user spectrum in selectable single or double hop, and moves reachback AISR data to ground station, e.g., ground data link 630 (Focused User Beam on Single Satellite) FIG. 9B shows a jammer condition with focused user beam, where jammers 940 include up to 18 high-powered fixed jammers in side lobes 930 of satellite's return link user footprint. The signals in this setting may be processes by using triad system ground-based single satellite side-lobe adaptive filtering, e.g., Regional Targeting ABF (focused used beam). FIG. 9C depicts a jammer condition with focused user beam, where jammers 940 include up to two high powered fixed jammers in main beam 920 of satellite's return link user footprint. The signals in this setting may be processes by using triad system ground-based multi-satellite sparse aperture side lobe suppression, e.g., Precision Targeting ABF (spread used beam).

FIG. 9D depicts a jammer condition with focused user beam, where jammers 940 include up to three high powered fixed jammers in main beam 920 and up to 12 high powered fixed jammers in the sidelobe 930 of satellite's return link user footprint. The signals in this setting may be processes by using triad system ground-based multi-satellite sparse aperture side lobe suppression, e.g., Regional Targeting ABF/Precision Targeting ABF (spread used beam). FIG. 9E shows a jammer condition with spread user beam, where jammers 940 include up to 20 high powered fixed jammers in main beam 920 and sidelobes 930 of satellite's return link user footprint. The signals in this setting may be processes by using triad system ground-based single satellite side and multi-satellite sparse aperture suppression, e.g., Regional Targeting ABF/Precision Targeting ABF (spread used beam). FIG. 9F shows a jammer condition with spread user beam, where jammers 940 include up to one high powered mobile jammer 945 in main beam 920 and up to six high powered mobile jammer 945 in sidelobes 930 of satellite's return link user footprint. The signals in this setting may be processes by using triad system ground-based single satellite side lobe adaptive filtering, multi-satellite sparse aperture suppression, and MUD/Regional Targeting ABF/Precision Targeting ABF.

Figure 10:
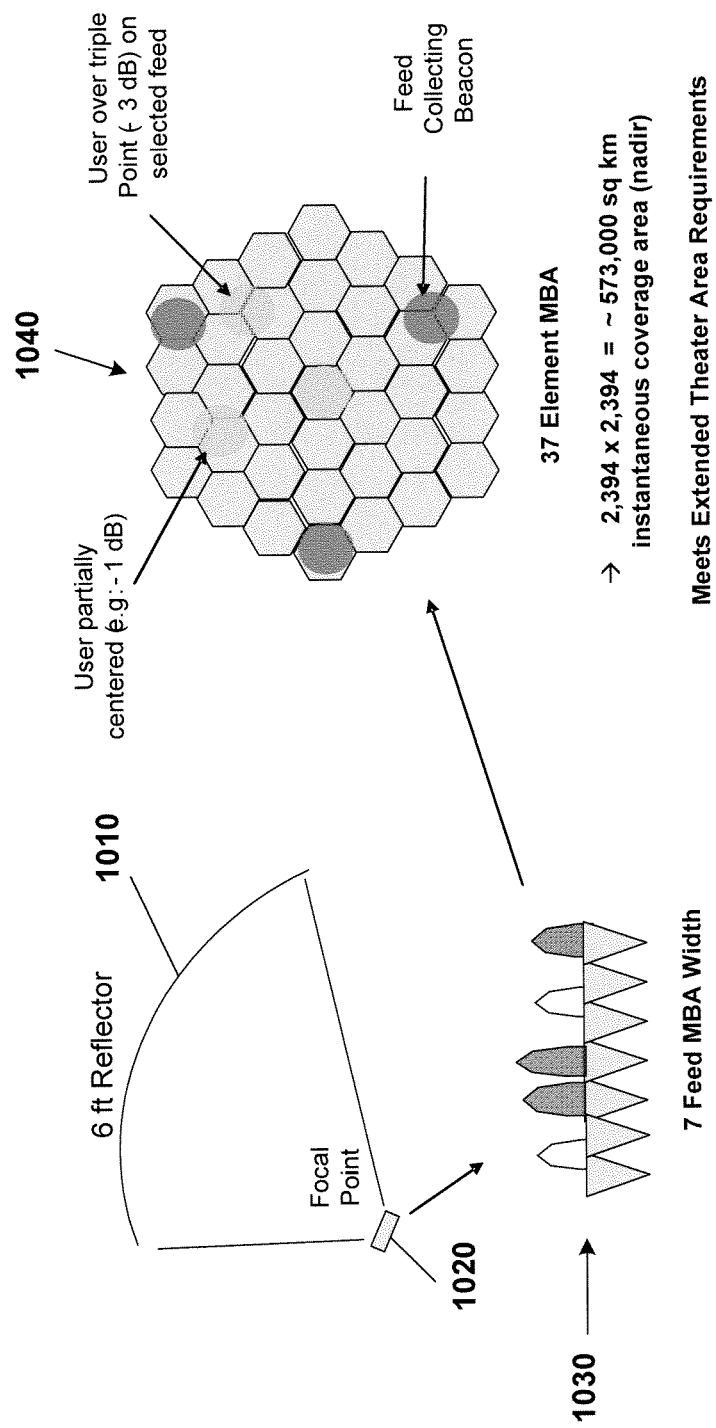
FIG. 10 is a diagram illustrating an example antenna concept for a satellite receiver, according to certain embodiments.

FIG. 9G depicts the scalability of the triad concept. The graph shows performances of one, two, and three satellites in a given Ka slot requiring various techniques for jammer suppression. With one satellite, jammer suppression using Regional Targeting ABF/MUD can be used. With two satellites, Regional Targeting ABF/Precision Targeting ABF/MUD is available but Precision Targeting ABF is only useful for jammers with some perpendicular offset from the line between the two satellites. With three satellites, an equilateral triangle is formed and Regional Targeting ABF/Precision Targeting ABF/MUD is available to use against interferers in any axis. For illustration purposes, all contested performances using various combinations of suppression techniques have been normalized to a 100 Mbps benign user performance FIG. 10 is a diagram illustrating an example antenna concept for a satellite receiver, according to certain embodiments. Reflector 1010 may be 6 ft reflector focusing beams on a feed horn 1020 at its focal point. The feed horn may include a seven feed MBA 1030 with a width of 7×(0.49 deg beam width/$\pi$/6)×36,500=2,394 km. The feed horn may comprise a 37 element MBA 1040 covering an area of 2,394×2,394=~573,000 sq km at nadir, which may meet extended theatre area requirement. The dots on the feeds represent user and beacon beams partially centered on a feed, fully centered and over triple point on selected feeds, as shown on 37 MBA element 1040.

FIG. 11 is a set of tables each illustrating an example of various assets that can be supported by the triad system under various conditions, according to certain embodiments. The laser communications between AISR and geosynchronous relays may promise jammer resistant data rates greater than RF systems for less airborne SWaP and aperture drag. However, if and when an operational multiple access laser communications system is fielded in space, head counts may be limited to 16 or less simultaneous users, and the individual link data rates may be limited by the aggregate capacity of the RF based Mission Data Link. As an example, a 3 Gbps RF Mission Data Link may restrict the average laser link to 187.5 Mbps for 16 links. Use of laser communications for low altitude AISR platforms or ground based terminals may be restricted to fair weather and impacted by atmospheric turbulences. Against high powered jammers, triad offers similar protection as laser communications, except supports a lesser quantity of users at lower average data rates. However, the triad may be backward compatible with Ka AISR links, can operate through foul weather, may be immune to turbulence, and is highly scalable. In benign environments, triad may be able to support up to 2 dozen Global Hawks at CDL (or higher data rates) plus hundreds of SNE terminals simultaneously, as shown in FIG. 11. In a mixed environment of benign operations and jammer suppression, triad may be able to support a dozen Global Hawks at CDL rates plus hundreds of SNEs simultaneously. In the full jammer mode, where 20+ high powered jammers interfere with all users, the triad may be able to support a few Global Hawks at ½ CDL rates plus approximately 50 SNE terminals simultaneously. Thus, the triad may provide greater support to the users across a broader range of operational conditions than laser communications.

Figure 12B:
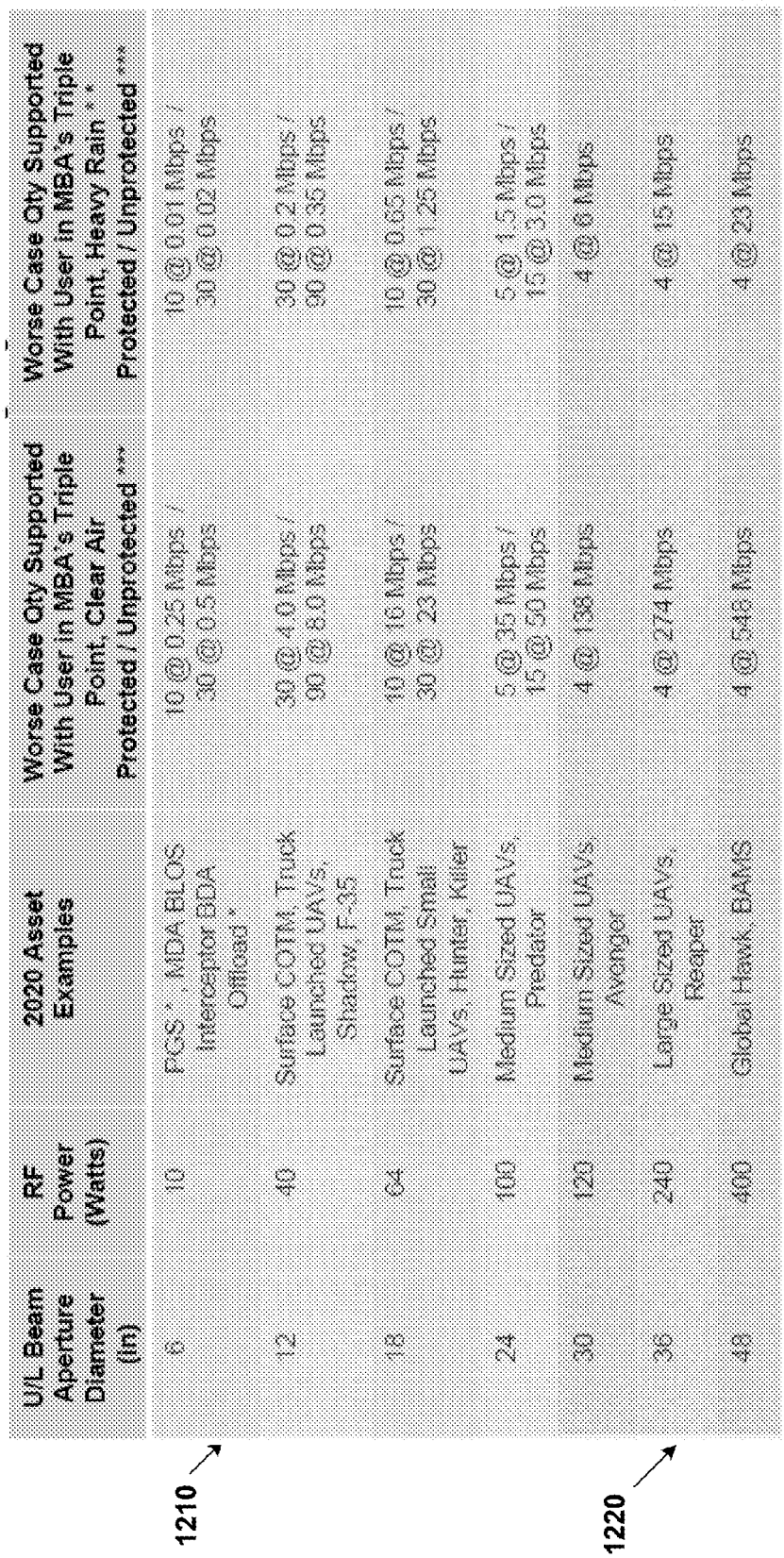

FIGS. 12A-12C are tables illustrating asset reachback data rates for various apertures, powers, and beam widths in a number of weather conditions, according to certain embodiments. In FIGS. 12A-12C, a first shaded portions 1210 of the tables correspond to optional configuration links including: 1) jammer protected at 1× quantity per slot or 2) unprotected at 3× quantity per slot. The second shaded portions 1220 correspond to unprotected high data rate links at 3× quantity per slot. The data in the tables are self explanatory.

Figure 13:
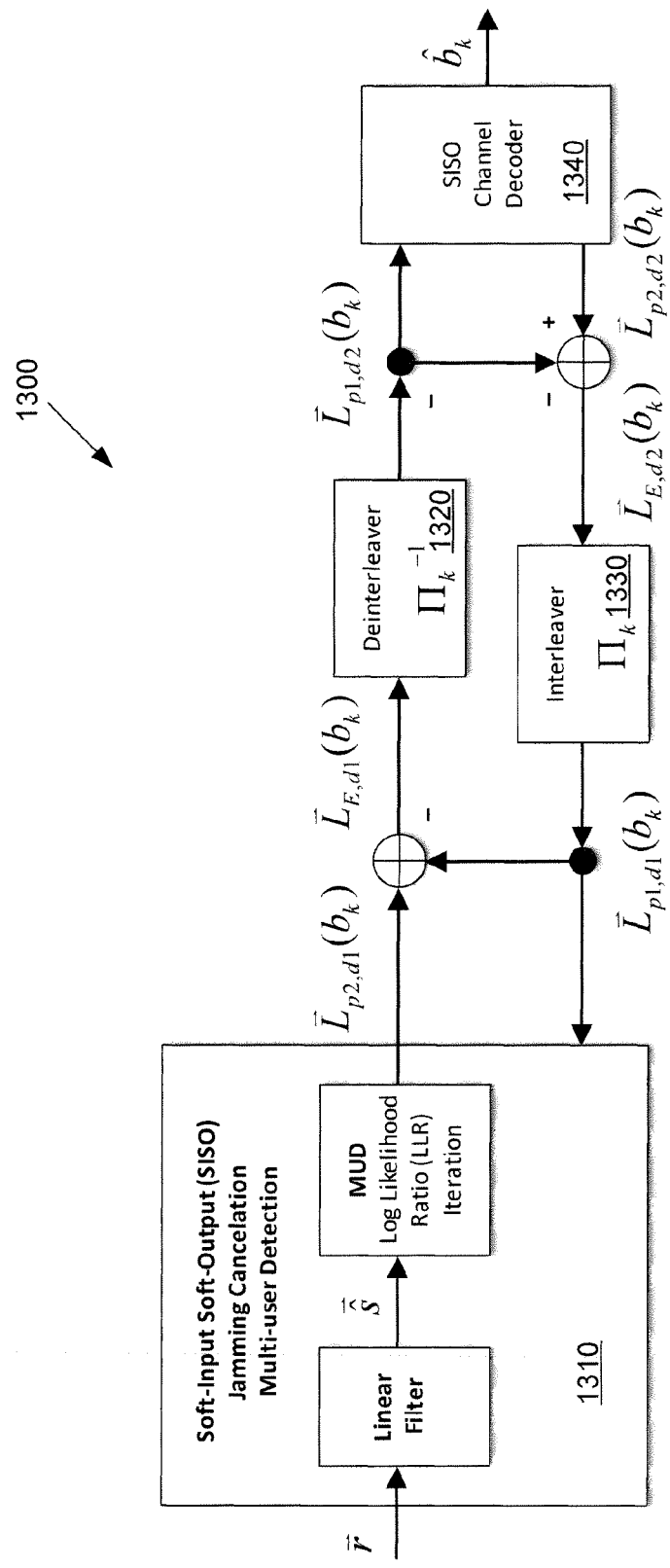
FIG. 13 is block diagram illustrating an example of an iterative multiuser and beamforming assisted detection, according to certain embodiments.

FIG. 13 is block diagram illustrating an example of an iterative multiuser and beamforming (i.e., Regional Targeting ABF or Precision Targeting ABF) assisted detection, according to certain embodiments. Adaptive digital beamforming is widely used in several radar systems. A digital beamforming (DBF) architecture and processing algorithm is described herein for nulling the signal from a mainlobe electronic jammer and multiple sidelobe electronic jammers while maintaining received signal angle estimation accuracy on the desired users. In general, the implementation of DBF for the satellite communications may consist of a sidelobe jamming cancelling adaptive array followed by a mainlobe jamming canceller. Ideally, a main lobe maintenance technique or constrained adaptation during the sidelobe cancellation process may be imposed so that the results of the sidelobe jamming cancellation process do not distort the subsequent mainlobe cancellation process. The sidelobe jamming signals and the mainlobe jamming signals may be cancelled sequentially in separate processes. This technique may be applied to two or more unique satellite communication payloads formation flying about one or more geosynchronous orbital slots with each satellite viewing the same theatre area of coverage. For each satellite, the realization of a digital beamforming may include implementing the phase synchronization and amplitude equality among RF front-end channels. Also, the DBF may perform high speed data processing to permit real-time operation, and rapid transfer of large amount of data between the antenna elements and the DBF processors. In addition, in order for the DBF to perform beamforming and nulling, the signals received from the multiple satellites (i.e., three) will be coherent. For example, this approach may mitigate several interfering signals while maintaining optimal Signal-to-Interference for users. Interference may be mitigated by adaptive DBF applied at the signal of interest bandwidth. Two techniques may be employed; the first, called Regional Targeting Adaptive Beamforming (Regional Targeting ABF) may use the seven overlapped beams from a septet of physical antenna array elements of a single collector. This technique may remove interferers in the sidelobes of the beam formed from the septet of elements. The second technique, Precision Targeting Adaptive Beamforming (Precision Targeting ABF), may adaptively null interferers by employing elements across the GEO Triad satellite constellation.

Multiuser detection may perform as a temporal filtering of the received signal to effectively suppress the multiple-access interference (i.e., jamming). The optimum multiuser detector may be exponentially complex in the number of terminal users. A number of low-complexity suboptimum receivers have been developed. Among these low-complexity receivers, the minimum mean squared error (MMSE) detector may minimize the expected squared error between the transmitted signal and the output of the receiver filter. Increasing the capacity of the subject transponder satellite communication system by employing adaptive DBF may aid MUD at the base station, where the outputs of the multiple antenna array elements are combined to make bit decisions for the desired users. Matched filter receivers are assumed in the temporal domain for each user, and the array observations may be combined via a filter that is matched to the array response of the user, i.e., single user processing is employed in both domains.

Adaptive DBF for the interference mitigation of capacity enhancement that utilizes the spatial diversity may be space-time processing for transponder satellite signals, which may refer to receiver beamforming (space processing) and multi-path/multiple taps combining (time processing), such as the Precision Targeting ABF approach. The received signals from different paths and antennas may be combined to better decode the desired user's bits. In one aspect, an iterative MUD and adaptive DBF may be applied to mitigate various types of jamming through the transponder wideband satellite system. While beamforming can cancel out most of the jamming interference from users out of beam, MUD for inside beam users can suppress the remaining jamming interference. Since the iterative MUD and adaptive DBF exploit the temporal and spatial structure of the jamming interference respectively, this approach may cancel or suppress the impact of jamming to ensure the satellite communications quality of service (QoS).

In one aspect, the approach of the iterative multiuser beamforming receiver's structure may be represented by the detector 1300 shown in FIG. 13, which consists of two stages. The soft-input soft-output (SISO) jamming interference cancellation aided beamforming multiuser detector stage 1310 is followed by K parallel single-user SISO channel decoders 1340. The two stages may be separated by the usual deinterleavers 1320 and interleavers 1330. Detector 1300 can optimally reduce jamming interference when both beamforming and MUD are applied. First, adaptive DBF can cancel out most jamming interference in the beam different from desired users. Second, an adaptive beamforming may assist the MUD unit to cancel out remaining jamming interference at the same or different beamforming (i.e., Regional Targeting ABF and Precision Targeting ABF) region as the desired users. A MMSE beamforming assisted MUD via an adaptive DBF, such as Regional Targeting ABF or Precision Targeting ABF can provide a priori information to the MUD receivers. It can significantly improve the performance of the conventional MUD detector in the presences of any jamming interference.

The SISO beamforming MUD may first compute the estimated symbol $\hat{s}_k$ corresponding to the transmitted symbol $s_k$ using a linear filter, which determines the coefficients of the beamformer weight $w_k(n)$ according to the specific design criterion employed in the Regional Targeting ABF, Precision Targeting ABF and may use this weight to estimate $\hat{s}_k$ from the received signal r with the aid of a linear transformation. The clustered beam users can be identified with correlation value of the beamforming weights regardless of whether the jammer is within the beam. The correlation value $\rho_{ij}$ of the beamforming weights of two users (k=i,j) may be given by:

$$\rho_{i,j} = \frac{w_i^H \cdot w_j}{|w_i| \cdot |w_j|}$$

The correlation values for transponder users may be compared against a pre-determined threshold value, which can be defined from the outputs of the DBF (i.e., Regional Targeting ABF/Precision Targeting ABF) users' signal characteristics. After identifying the clustered beam users from correlation value of beamforming weights, one can apply the decorrelating MUD for users within or out the same clustered beam. Here $b_k(n,i)$ can be defined as the ith bit of symbol $s_k(n)$, whereas $b_k(j)$ is the same bit but in a different position of the bit-based interleaving block after the deinterleaver. The indices d1 and d2 may be associated with the multiuser detector and channel decoder, respectively, and the p1, p1, and e indices may be used for the a priori, a posteriori and extrinsic information. Then the SISO adaptive DBF MUD delivers the a posteriori information of bit $b_k(n,i)$ expressed in terms of its Log-Likelihood Ratio (LLR) as:

$$L_{p2,d1}(b_k(n, i)) = \ln \frac{p\{b_k(n, i) = 0 \mid \hat{s}_k(n)\}}{p\{b_k(n, i) = 1 \mid \hat{s}_k(n)\}} = L_{E,d1}(b_k(n, i)) + L_{p1,d1}(b_k(n, i))$$

where $L_{p1,d1}(b_k(n,i))$ represents the a priori LLR of the interleaved and recursive systematic convolutional (RSC) encoded bit, $b_k(n,i)$. The first term the above equation, denoted by $L_{E,d1}(b_k(n,i))$, represents the extrinsic information delivered by the SISO MUD, based on the received signal r(n) and the a priori information about the encoded bits of all users, except for the ith bit of the desired user k. The extrinsic information is then deinterleaved and fed into the kth user's channel decoder, which provides the a priori information in the next iteration. Similar to iterative detection of turbo codes, in FIG. 13, between the parallel of channel decoders and interleavers, we compute the extrinsic LLR based on the a priori information $L_{p1,d2}(b_k)$ provided by the SISO beamforming MUD. It is used for the SISO decoder as $L_{d2}(b_k) = L_{p2,d2}(b_k) - L_{p1,d2}(b_k)$, where the extrinsic information is gleaned from the surrounding encoded bits, excluding the specific bit used. After interleaving, the extrinsic information delivered by the channel decoders may be fed back to the SISO MUD, as the a priori information concerning the encoded bits of all the users for exploitation during the next iteration.

In iterative multiuser receivers, the MUD and the channel decoder may exchange extrinsic information in a number of consecutive iterations. During each iteration, the extrinsic information extracted from both the MUD and the channel decoder may be used as the a priori input by the other stage in the next iteration. The information exchanged may be exploited for the sake of improving the receiver's attainable performance. Herein, we use one of the suboptimal linear MUD, which benefited from both soft interference cancellation and instantaneous linear minimum mean squared error filtering.

Assume a priori LLR, one may also define the mean and variance based on the a priori information of the kth user's symbols for the M-ary PSK or QAM users' signal constellation as $$\vec{s_k} = E[s_k] \text{ and } \varphi_k^2 = E[|s_k|^2 - |\vec{s_k}|^2].$$

The estimated symbol of user k can be expressed as:

$$\hat{s_k} = w_k^H (r - H\vec{s_k})$$

where $$\vec{s_k} = [\overline{s_1}, \ldots, \overline{s_{k-1}}, 0, \overline{s_{k+1}}, \ldots \overline{s_K}].$$

The MMSE solution for the adaptive DBF beamformer's weight vector $w_k$ is:

$$w_{k,MMSE} = (HV_k H^H + E_s h_k h_k^H + 2\sigma_n^2 I_L)^{-1} \cdot E_s h_k$$

where $E_s$ is the average symbol energy, $I_L$ denotes the L×L identity matrix and $$\underline{V_k} = dig[\rho_1, \ldots, \rho_{k-1}, 0, \rho_{k+1}, \ldots, \rho_K]$$

The conditional PDF $P[\hat{s_k} | s_k = s^{(p)}]$, where $s^{(p)}$ is the pth ($p \in \{1, 2, 3, \ldots, M\}$) legitimate value of the M-ary PSK or QAM constellation, may be assumed to be Gaussian distributed and the corresponding extrinsic output LLR is:

$$L_E(b_k(i)) = \ln \frac{\sum_{\forall s(p):b(p)(i)=0} \exp\left(\frac{-|\hat{s_k} - \mu_k^{(p)}|^2}{\sigma_k^2}\right) \prod_{\forall i' \neq i} P(b_k^{(p)}(i'))}{\sum_{\forall s(p):b(p)(i)=1} \exp\left(\frac{-|\hat{s_k} - \mu_k^{(p)}|^2}{\sigma_k^2}\right) \prod_{\forall i' \neq i} P(b_k^{(p)}(i'))}$$

where $b^{(p)}(i)$ is the ith bit of $s^{(p)}$ in FIG. 13, $$\mu_k^{(p)} = s^{(p)} w_k^H h_k, \sigma_k^2 = E_s w_k^H h_k (1 - w_k^H h_k)$$

and the a priori probability of the i'th bit in symbol $s_k$ is:

$$P(b_k^{(p)}(i')) = \frac{1}{2}\left(1 + \text{sgn}\left(\frac{1}{2} - b^{(p)}(i')\right) \cdot \tanh\left(\frac{L_{p2}(b_k(i'))}{2}\right)\right)$$

In some aspects, to suppress peer-level swept tone jammers, an iterative process using the sparse aperture adaptive spatial and the Multi-User Detection (MUD) processing may be used. Suppressing a priori unknown number of active friendly users and jammers may require simultaneous estimation of the active user set, its unknown parameters, and transmitted data from the composite image. In an aspect, maximum likelihood sequence detection using recursive least squares detections can iteratively realize the hypothesis.

Compared to a single-hop transponded system, double-hop ground based iterative sparse aperture and MUD processing may introduce an additional delay from several ms to seconds, depending on the number of users, jammers, and the number of hypotheses (M). Unlike sparse aperture jammer suppression requiring modest S/N improvement to suppress a limited numbers of high powered jammers, suppression of peer jammers may require an additional 8.2 dB of SNR.

In one aspect, the interference mitigation approach may be derived from algorithms that mitigates thousands of interfering signals while maintaining optimal signal-to-interference (SI) on users. Interference may be mitigated by digital adaptive beamforming applied at the signal of interest (SOI) bandwidth. Two techniques may be employed; the first, called Regional Targeting adaptive beamforming (Regional Targeting ABF), may use the seven overlapped beams from a septet of physical antenna array elements of a single collector. The Regional Targeting ABF technique may remove interferers in the sidelobes of the beam formed from the septet of elements. The second technique, Precision Targeting Adaptive Beamforming (Precision Targeting ABF), may adaptively null interferers by employing elements across the triad (e.g., triad COMSATs 120 of FIG. 1B). The triad's large sparse aperture may provide the resolution to null interferers within the main beam of the Septet generated beam. Operationally, a hybrid mix of these two techniques (i.e., Regional Targeting ABF and Precision Targeting ABF) may be employed optimizing the use of processing and antenna resources in nulling interferers.

Unlike Regional Targeting ABF, which may use a covariance matrix that spans across the antenna elements of a single collector, Precision Targeting ABF may use a space-time covariance matrix that spans all the antenna elements in the triad. By adaptively adjusting the weights on each beam at multiple taps (in time), nulls can be placed in some locations while preserving gain in others, across the entire received bandwidth. The number of gain/null constraints employed may be less than or equal to the number of spatial degrees of freedom across the triad (e.g., 21). The depth of the nulls may be largely limited by the dynamic range of the receivers. When septets from the triad are used, the resulting N=21 inputs may allow nulling of up to N−1=20 interferers (per frequency slice per user signal resolution). This number may be less when multiple constraints are assigned to mitigate either a moving and/or a wide-bandwidth interferer, or if some of the constraints are assigned to maintain gain on multiple, moving and/or weak user signals. Computational resources can be conserved in some scenarios by using Regional Targeting ABF outputs as input to Precision Targeting ABF. Supporting a hybrid mix of such multi staged algorithm structures may allow optimization of overall system cost and evolution of the capabilities.

In the single-stage full up Precision Targeting ABF process, feeds from the collectors across the triad may be processed in conjunction. This can provide an excellent performance, but may be computationally intensive. In the two-stage Regional targeting ABF/Precision Targeting ABF process, preliminary side-lobe nulling may be performed over subsets of feeds, and the resulting beams may be processed in conjunction. The cost/performance trade of single vs. multi-stage processing may be a key analysis.

An aspect of the Precision Targeting ABF technique may optimize the size and density of the covariance matrix for the interference environment with a resultant reduction of up to 100 times in computational intensity over a more "academic" implementation. For loud interferers, the tap delay choices may be governed by the locations where nulling (interferer mitigation) or gain preservation (SOI locations) are desired. The matrixes may be large enough to encompass the sparse array delay spread. The tap positions can be estimated directly from sample space-time covariance matrixes. The resulting gain/loss map may only vaguely resemble a traditional single-frequency beam pattern. Across the band, the nulls and peaks ("grating lobes") constructively and destructively may interfere in the regions where they are not constrained in the weight computation, and as such may not be individually tracked. The associated SNR penalty may be accounted for in the link budget. Overlapping updates may maintain gain on individual users. The update rate may be dependent on the speed of the SOI ground platform and the grating lobe beam width. Stressing situations may involve evaluation of multiple solutions for an active user, with selection and tracking applied among the solutions to optimize signal to interference vs. computational cost. In some aspects, the algorithms may operate on frequency slices as narrow as the channelizer frequency slice and operate cross-slice to the bandwidth of a user channel. Multiple concurrent adaptive beaming solutions may be applied with the interference mitigation tailorable to individual users in individual beams.

The Regional Targeting ABF and Precision Targeting ABF adaptive beamforming may remove interference in the space-time domain, and may be largely agnostic to the signal characteristics of both the SOIs and interferers. In an aspect, the interference mitigation may be further enhanced for signal specific and co-channel interference with the MUD methods (e.g., interference cancellation) that exploit known waveform information to further mitigate the interference and enhance the signals of interest. Such methods may remove co-channel interferers in the modulation constellation domain. The MUD techniques may enhance the constellation of the desired signals thus removing interferers. The adaptive beamforming and MUD techniques may be applied in conjunction to enhance their mutual performance.

In some aspects, the subject technology is related to correlative coding. In some aspects, the subject technology may be used in various markets, including for example and without limitation, data transmission and communications markets.

The description of the subject technology is provided to enable any person skilled in the art to practice the various embodiments described herein. While the subject technology has been particularly described with reference to the various figures and embodiments, it should be understood that these are for illustration purposes only and should not be taken as limiting the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various embodiments described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the invention has been described with reference to the disclosed embodiments, one having ordinary skill in the art will readily appreciate that these embodiments are only illustrative of the invention. It should be understood that various modifications can be made without departing from the spirit of the invention. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range is specifically disclosed. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted.

What is claimed is:

1. A satellite communication system for airborne and reachback communications, comprising:
   a formation including at least two communications satellites (COMSATs) operable to encircle a ring distinguished from geosynchronous orbits, while simultaneously orbiting in one or more slots of a geosynchronous orbit, each COMSAT of the at least two COMSATs including a communication module configured to communicate with a plurality of communications assets in a benign or contested environment, wherein the formation is configured to allow at least one of:
   a first communications asset having a dish antenna with a first configuration to communicate independently with each of the at least two COMSATs in a first scenario, and
   a second communications asset having a dish antenna with a second configuration to communicate simultaneously with the at least two COMSATs in a second scenario wherein the first scenario comprises a bandwidth multiplication scenario for which the formation is configured to provide a bandwidth multiplication approximately equal to a count of the at least two COMSATs included in the formation in a non-contested environment.

2. The satellite communication system of claim 1, wherein the ring has a nearly circular shape and is configured to provide the formation with a sparse aperture of approximately 750 kilometer.

3. The satellite communication system of claim 2, wherein the formation inclination is approximately twice as the eccentricity of the ring.

4. The satellite communication system of claim 1, wherein the first configuration includes a first dish antenna aperture and a first beam configuration, and wherein the first dish antenna aperture is equal or greater than 4 feet and the first beam configuration includes a beam directed to one of the at least two COMSATs.

5. The satellite communication system of claim 1, wherein the second configuration includes a second dish antenna aperture and a second beam configuration, wherein the second dish antenna aperture is less than 3 feet and the second beam configuration includes a beam directed to the center of the formation, and wherein the second communications asset includes a friendly low-power emitter.

6. The satellite communication system of claim 1, wherein the second scenario comprises a protection scenario in a contested environment for which the formation is configured to provide protection capability against one or more jammers including a swept jammer.

7. A method, for airborne and reachback communications, comprising:
communicating from a communications satellite (COMSAT) of a formation with one or more of a plurality of communications assets in a benign or contested environment, the formation including at least two (COMSATs) encircling a ring distinguished from geosynchronous orbits, while simultaneously orbiting in one or more slots of a geosynchronous orbit;
independently communicating by each of the at least two COMSATs with a first communications asset having a dish antenna with a first configuration in a first scenario; and
simultaneously communicating by the at least two COMSATs with a second communications asset having a dish antenna with a second configuration in a second scenario wherein the first scenario includes a bandwidth multiplication scenario in the benign environment, and the method further comprises providing, in the first scenario, a bandwidth multiplication approximately equal to a count of at least two COMSATs included in the formation.

8. The method of claim 7, wherein the second scenario comprises a protection scenario in the contested environment, for which and the method provides protection capability against one or more jammers including a broadband jammer.

9. A communication asset for airborne and reachback communications, comprising:
a communication module configured to communicate, in a benign or contested environment, with at least one communications satellite (COMSAT) of a formation including at least two COMSATs operable to encircle a ring distinguished from geosynchronous orbits, while simultaneously orbiting, in one or more slots of a geosynchronous orbit; and
a dish antenna configured with at least one of:
a first configuration that allows the dish antenna to communicate independently with each of the at least two COMSATs in a first scenario, and
a second configuration to communicate simultaneously with the at least two COMSATs in a second scenario wherein the first scenario comprises a bandwidth multiplication scenario for which the communication asset is provided with a bandwidth multiplication approximately equal to a count of the at least one COMSATs of the formation in the non-contested environment.

10. The receiver device of claim 9, wherein the communication asset comprises at least one of an airborne or a ground communication asset, wherein the ring has a nearly circular shape and is configured to provide the formation with a sparse aperture of approximately 750 kilometer, and wherein the formation inclination is approximately twice as the eccentricity of the ring.

11. The receiver device of claim 9, wherein the first configuration includes a first dish antenna aperture and a first beam configuration, and wherein the first dish antenna aperture is equal or greater than 4 feet and the first beam configuration includes a beam directed to one of the at least two COMSATs, and wherein the second configuration includes a second dish antenna aperture and a second beam configuration, wherein the second dish antenna aperture is less than 3 feet and the second beam configuration includes a beam directed to the center of the formation, and wherein the second communications asset includes a friendly low-power emitter.

12. The receiver device of claim 9, wherein the second scenario comprises a protection scenario in the contested environment for which the communication asset is provided with protection capability against one or more jammers including a swept jammer.

* * * * *